US012447548B2

(12) United States Patent
Dunbar et al.

(10) Patent No.: US 12,447,548 B2
(45) Date of Patent: Oct. 21, 2025

(54) JACKET FOR A CARTRIDGE OF A LIQUID-COOLED PLASMA ARC TORCH

(71) Applicant: Hypertherm, Inc., Hanover, NH (US)

(72) Inventors: Stephen M. Dunbar, Lebanon, NH (US); Christopher Pillsbury, Lebanon, NH (US); Micah Roberts, Lebanon, NH (US); David L. Bouthillier, Hartford, VT (US)

(73) Assignee: Hypertherm, Inc., Hanover, NH (US)

( * ) Notice: Subject to any disclaimer, the term of this patent is extended or adjusted under 35 U.S.C. 154(b) by 1038 days.

(21) Appl. No.: 17/370,485

(22) Filed: Jul. 8, 2021

(65) Prior Publication Data

US 2022/0009019 A1 Jan. 13, 2022

Related U.S. Application Data

(60) Provisional application No. 63/049,408, filed on Jul. 8, 2020.

(51) Int. Cl.
*B23K 9/29* (2006.01)
*B23K 9/013* (2006.01)
*B23K 9/14* (2006.01)
*B23K 9/28* (2006.01)
*B23K 35/02* (2006.01)

(52) U.S. Cl.
CPC .................. *B23K 9/29* (2013.01); *B23K 9/14* (2013.01); *B23K 9/285* (2013.01); *B23K 35/0261* (2013.01); *B23K 9/013* (2013.01)

(58) Field of Classification Search
CPC ...... B23K 35/0261; B23K 9/013; B23K 9/14; B23K 9/285; B23K 9/29; H05H 1/3457; H05H 1/3468; H05H 1/38

USPC ....................................................... 219/137.2
See application file for complete search history.

(56) References Cited

U.S. PATENT DOCUMENTS

| 3,307,011 A | * | 2/1967 | Baird | ................... B23K 35/402 |
| | | | | 219/74 |
| 8,981,252 B2 | | 3/2015 | Liebold et al. | |
| 9,867,268 B2 | | 1/2018 | Currier et al. | |
| 10,278,274 B2 | | 4/2019 | Sanders et al. | |
| 11,014,188 B2 | | 5/2021 | Yamaguchi et al. | |
| 2005/0067387 A1 | | 3/2005 | Cook et al. | |
| 2011/0168681 A1 | * | 7/2011 | Hussary | ................... H05H 1/34 |
| | | | | 219/121.51 |

\* cited by examiner

*Primary Examiner* — Chris Q Liu
*Assistant Examiner* — James F Sims, III
(74) *Attorney, Agent, or Firm* — Cesari and McKenna, LLP

(57) ABSTRACT

A jacketed consumable cartridge is provided for a liquid cooled plasma arc torch. The jacketed consumable cartridge comprises an electrode, a swirl ring securely affixed to and disposed circumferentially about a distal end of the electrode, and a nozzle securely affixed to the swirl ring, the nozzle disposed circumferentially about the distal end of the electrode with a portion of the swirl ring located therebetween. The cartridge also comprises a cartridge jacket securely affixed to and disposed circumferentially about a distal end of the nozzle and a shield securely affixed to and disposed circumferentially about a distal end of the cartridge jacket. A proximal end of the cartridge jacket is adapted to extend (i) axially past a proximal end of the shield and (ii) radially beyond a radial extent of the shield.

38 Claims, 13 Drawing Sheets

JACKET FOR A CARTRIDGE OF A LIQUID-COOLED PLASMA ARC TORCH

CROSS REFERENCE TO RELATED APPLICATION

This application claims the benefit of and priority to U.S. Provisional Patent Application No. 63/049,408, filed Jul. 8, 2020, the entire contents of which are owned by the assignee of the instant application and is incorporated herein by reference in its entirety.

TECHNICAL FIELD

The present invention generally relates to a jacket for a consumable cartridge of a liquid-cooled plasma arc torch, where the cartridge has multiple integrated components.

BACKGROUND

Thermal processing torches, such as plasma arc torches, are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Existing plasma cutting systems include a large array of separate consumables (e.g., six distinct consumables) available for use with different currents and/or operating modes that are repeatedly assembled and disassembled in the field by a user to perform thermal processing operations. The large number of consumable options requires large part counts and inventories for users, and can confuse users and increase the possibility of installing incorrect consumables. For example, these consumables typically have varied life expectancies with different part numbers that an end user can easily mix up, resulting in poor cut quality or ruined workpieces and/or torch parts. The large number of consumable options can also cause lengthy torch setup time(s) and make it difficult to transition among cutting processes that require different arrangements of consumables in the torch that is often performed in the field one component at a time. For example, a special tool is often required to install and uninstall at least one of an electrode or nozzle from a torch for the purpose of maintenance and replacement. Thus, before a cutting operation, selecting and installing the correct set of consumables for a particular cutting task can be burdensome and time-consuming. Furthermore, selection, assembly, and installation of these components in the field can cause alignment issues or compatibility issues when old components are used with new components. During torch operation, existing consumables can experience performance issues such as failing to maintain proper consumable alignment and spacing. Because each consumable needs to be individually aligned, existing plasma arc torches and consumables are machined with relatively tight tolerances to facilitate proper alignment.

What is needed is a new and improved consumable platform for liquid-cooled plasma arc torches that decreases part count, increases system performance (e.g., component alignment, cut quality, consumable life, variability/versatility, etc.), and eases installation and use of consumables by end users.

SUMMARY

The present invention provides one or more integrated, cost-effective cartridge designs for a liquid-cooled plasma arc torch. Generally, because a cartridge includes a suite of two or more consumable components, it provides ease of use and shortens the time for installation into a plasma arc torch in comparison to installing/replacing each consumable component individually in a traditional plasma arc torch. Using a consumable cartridge also reduces the possibility of an operator putting in the wrong consumable parts, contaminating the parts during installation and/or placing a weak or bad part back onto the torch by accident. These advantages eliminate the need for experienced operators to operate the resulting liquid-cooled plasma arc torches. In addition, the use of a cartridge in a liquid-cooled torch improves component alignment, cut consistency and cut quality. Further, using consumable cartridges enhances suppliers' experience as fewer consumable parts need to be inventoried and stocked.

In one aspect, the present invention features a jacketed consumable cartridge for a liquid cooled plasma arc torch. The jacketed consumable cartridge comprising an electrode, a swirl ring securely affixed to and disposed circumferentially about a distal end of the electrode, and a nozzle securely affixed to the swirl ring, the nozzle disposed circumferentially about the distal end of the electrode with a portion of the swirl ring located therebetween. The jacketed consumable cartridge also includes a cartridge jacket securely affixed to and disposed circumferentially about a distal end of the nozzle and a shield securely affixed to and disposed circumferentially about a distal end of the cartridge jacket. A proximal end of the cartridge jacket is adapted to extend (i) axially past a proximal end of the shield and (ii) radially beyond a radial extent of the shield.

In some embodiments, the swirl ring is securely affixed to the electrode via two distinct circumferential interfaces on an interior surface of the swirl ring. In some embodiments, the cartridge jacket is securely affixed to the nozzle via at least two distinct circumferential interfaces on an exterior surface of the nozzle. In some embodiments, the shield is securely affixed to the cartridge jacket via a retention feature disposed circumferentially about an external surface of the cartridge jacket. The retention feature is configured to receive the proximal end of the shield to securely affix the shield.

In some embodiments, the nozzle is securely affixed to the swirl ring via two distinct circumferential interfaces on an exterior surface of the swirl ring. The swirl ring can include a plurality of slots formed on the exterior surface and dispersed circumferentially about the swirl ring. The plurality of slots are shaped to complement an interior profile of the nozzle to define a set of gas swirl passages. In some embodiments, each of the plurality of slots is canted.

In some embodiments, at least one of the swirl ring or the cartridge jacket is constructed from an injection moldable plastic material. In some embodiments, the cartridge jacket is circumferentially disposed between the nozzle and the shield to physically separate and electrically isolate the nozzle and the shield.

In some embodiments, the proximal end of the cartridge jacket is shaped to flexibly engage a torch body of the plasma arc torch to form a seal that is substantial fluid tight to enable conveyance of both a liquid and a gas from the torch body to the cartridge. In some embodiments, the cartridge jacket includes a plurality of apertures circumferentially disposed about the proximal end, each aperture, connecting an interior surface to an exterior surface of the cartridge jacket, being configured to meter and channel the gas from the torch body to the shield. In some embodiments, the cartridge jacket includes a plurality of axial channels disposed in an interior surface of the cartridge jacket and interspersed circumferentially around the cartridge jacket, the plurality of axial channels configured to complement an external profile of the nozzle to define respective ones of coolant passages for conveying the liquid between the nozzle and the jacket.

In some embodiments, the nozzle comprises an alignment surface on an outer circumference of a proximal end of the nozzle, the alignment surface configured to enable alignment of the cartridge with a torch body of the plasma arc torch upon engagement between the cartridge and the torch body. In some embodiments, the electrode comprises a silver end disposed on the distal end of the electrode. In some embodiments, the shield includes a plurality of apertures disposed circumferentially about the proximal end of the shield, each aperture shaped to channel, meter, and swirl a gas flow traveling therethrough toward a shield exit orifice.

In some embodiments, a ratio of a length of the consumable cartridge to a width of the consumable cartridge is less than about 1.25.

In another aspect, a jacket for a consumable cartridge of a liquid cooled plasma arc torch is provided. The consumable cartridge, which includes an electrode, a nozzle and a shield, is configured to removably attach to a torch body of the plasma arc torch. The jacket comprises a substantially electrically insulating hollow body defining a longitudinal axis extending therethrough. The jacket also comprises a distal end of the hollow body disposed along the longitudinal axis. The distal end is configured to (i) matingly engage the nozzle at an interior surface of the hollow body, and (ii) extend into a proximal end of the shield to matingly engage the shield at an exterior surface of the hollow body. The jacket further comprises a proximal end of the hollow body disposed along the longitudinal axis opposite of the distal end. The proximal end extends axially past the proximal end of the shield and radially beyond a radial extent of the shield. The proximal end is configured to matingly engage the torch body.

In some embodiments, the jacket further comprises a plurality of apertures circumferentially disposed about the proximal end of the hollow body. Each aperture connects the interior surface of the hollow body to the exterior surface of the hollow body, and is configured to meter and channel a gas flow from the torch body to the shield. In some embodiments, a size of the plurality of apertures is configured to support a first operating current requirement of the consumable cartridge. This size is different from a size of a second plurality of apertures for a second jacket of a second consumable cartridge that is configured to support a different operating current requirement than the first operating current requirement of the consumable cartridge.

In some embodiments, the jacket further comprises a plurality of axial channels disposed into the interior surface of the hollow body and interspersed circumferentially around the hollow body. In some embodiments, the plurality of channels are configured to complement an external profile of the nozzle to define respective liquid coolant passages between the nozzle and the jacket. In some embodiments, the proximal end of the hollow body includes a circumferential coolant channel proximal to and in fluid communication with the plurality of axial channels to convey a coolant flow between the torch body and the nozzle via the plurality of axial channels.

In some embodiments, the jacket further comprises a retention feature disposed circumferentially about the external surface of the jacket at the distal end. The retention feature configured to receive the proximal end of the shield and lockingly engage the shield to the hollow body. In some embodiments, the jacket further comprises a plurality of interior alignment surfaces circumferentially disposed on the interior surface of the jacket. The plurality of interior alignment surfaces are configured to axially and radially align the nozzle relative to the jacket. In some embodiments, the jacket further comprises an exterior alignment surface circumferentially disposed on the exterior surface of the jacket. The exterior alignment surface is configured to axially and radially align the shield relative to the nozzle via the jacket.

In some embodiments, the hollow body of the jacket is constructed from an injection moldable plastic material. In some embodiments, an axial length of the hollow body is greater than an axial length of at least one of the nozzle, the shield or the electrode of the cartridge. In some embodiments, a ratio of a length of the jacket to a width of the proximal end is between about 0.7 and about 0.85, and a ratio of the length of the jacket to a width of the distal end is between about 1.4 and about 1.6.

In yet another aspect, in a consumable cartridge of a liquid cooled plasma arc torch, where the consumable cartridge is configured for attachment with a torch body of the plasma arc torch and the consumable cartridge includes a nozzle, a cartridge jacket and a shield, the improvement includes a plurality of apertures disposed circumferentially about a proximal end of a hollow body of the shield. The plurality of apertures connect an interior surface of the hollow body to an exterior surface of the hollow body. Each aperture is sized and shaped to channel, meter, and swirl a gas flow traveling therethrough toward an exit orifice of the shield.

In some embodiments, the consumable cartridge further comprises a retention feature disposed circumferentially about the interior surface of the shield at the proximal end. The retention feature configured to complement a corresponding retention feature of the cartridge jacket of the cartridge to securely engage the shield to the cartridge jacket.

In some embodiments, a portion of the exterior surface of the hollow body of the shield is adapted to be in fluid contact with a liquid coolant for cooling the shield.

In some embodiments, each of the plurality of apertures is angled to impart a tangential velocity to the gas flowing therethrough.

In yet another aspect, a method for assembling a consumable cartridge for a liquid cooled plasma arc torch. The method comprises securely affixing a swirl ring to a distal end of an electrode such that the swirl ring is disposed circumferentially about the distal end of the electrode and securely affixing a nozzle to the swirl ring such that the nozzle is disposed circumferentially about the distal end of the electrode with a portion of the swirl ring located therebetween. The method also comprises securely affixing a cartridge jacket to a distal end of the nozzle such that the cartridge jacket is disposed circumferentially about the distal end of the nozzle. The method further comprises securely affixing a shield to a distal end of the cartridge jacket such that the shield is disposed circumferentially about the cartridge jacket with a proximal end of the cartridge jacket extending axially past a proximal end of the shield and radially beyond a radial extent of the shield.

In some embodiments, the shield is axially and radially aligned relative to the nozzle via the cartridge jacket. In some embodiments, the cartridge jacket electrically isolates the shield and the nozzle. The cartridge jacket can be constructed from an injection moldable plastic material.

In some embodiments, a plurality of axial cooling passages are formed in the cartridge. The plurality of cooling passages are defined by (i) respective ones of a plurality of axial channels disposed into an interior surface the cartridge jacket and interspersed circumferentially about the cartridge jacket and (ii) a complementary external surface of the nozzle.

In some embodiments, the cartridge jacket includes a radially extending proximal end comprising a plurality of apertures circumferentially disposed about the proximal end. Each aperture is configured to meter and channel a gas flow from a torch body to the shield.

In some embodiments, a silver tip is disposed at the distal end of the electrode. In some embodiments, a ratio of a length of the consumable cartridge to a width of the jacket is less than about 1.25. In some embodiments, the consumable cartridge is attached to a torch body of the plasma arc torch. The nozzle of the consumable cartridge is adapted to axially and radially align the consumable cartridge relative to the torch body.

In another aspect, a method is provided for conveying at least one of a gas or a liquid in a liquid cooled plasma arc torch that includes a consumable cartridge and a torch body. The method comprises coupling the consumable cartridge to the torch body of the plasma arc torch. The consumable cartridge includes an electrode, a nozzle disposed circumferentially about and securely affixed to the electrode, a cartridge jacket disposed circumferentially about and securely affixed to the nozzle, and a shield disposed circumferentially about and securely affixed to the cartridge jacket. The method also comprises conveying the gas from the torch body to a plurality of apertures circumferentially disposed about a proximal tip of the cartridge jacket. The method further comprises metering and channeling, by the plurality of apertures, the gas from an interior surface of the cartridge jacket to an exterior surface of the cartridge jacket for conveyance of the gas over an exterior surface of the shield.

In some embodiments, the method further comprises metering and channeling, by a plurality of apertures disposed circumferentially about a proximal tip of the shield, the gas from the exterior surface of the shield to an interior surface of the shield, imparting, by the plurality of apertures disposed into the shield, a swirling pattern to the gas flow therethrough, and expelling the gas from the plasma arc torch via an exit orifice of the shield.

In some embodiment, the method further comprises circulating the liquid between the cartridge and the torch body to cool the plasma arc torch. Circulating the liquid includes conveying the liquid from at least one aperture of the torch body to one or more of a plurality of axial cooling passages defined by (i) respective ones of a plurality of axial channels disposed into an interior surface the cartridge jacket and interspersed circumferentially about the cartridge jacket and (i) an external surface of the nozzle. Circulating the liquid also includes conducting, by the one or more cooling passages, the liquid from a proximal tip of the nozzle to a distal tip of the nozzle over the external surface of the nozzle to cool the nozzle. Circulating the liquid further includes circulating the liquid around the distal tip of nozzle, and directing at least a portion of the liquid to the shield to cool the shield. In some embodiments, the at least portion of the liquid is directed to cool an exterior surface of the shield.

In some embodiments, the method further includes forming a seal between the torch body and the proximal tip of the cartridge jacket that is substantially fluid tight to enable conveyance of both the liquid and the gas from the torch body to the cartridge. The seal establishes a flexible engagement between the torch body and the proximal tip of the cartridge jacket.

In yet another aspect, a method is provided of installing a desired consumable cartridge in a liquid cooled plasma arc torch. The method comprises providing a first consumable cartridge comprising a first cartridge jacket configured to axially and radially align a first nozzle relative to a first shield within the first consumable cartridge. The first cartridge jacket is configured to support a first operating current requirement of the first consumable cartridge. The method also comprises providing a second consumable cartridge comprising a second cartridge jacket configured to axially and radially align a second nozzle relative to a second shield within the second consumable cartridge. The second cartridge jacket is configured to support a second operating current requirement of the second consumable cartridge that is different from the first operating current. The method further comprises selecting one of the first or second consumable cartridge by comparing a desired operating current with the first and second operating current requirements associated with the corresponding first and second consumable cartridges and installing the selected consumable cartridge to a torch body of the plasma arc torch.

In some embodiments, the first cartridge jacket comprises a first plurality of apertures configured to meter and channel shield gas flow, and the second cartridge jacket comprises a second plurality of apertures configured to meter and channel shield gas flow. In some embodiments, a first diameter of each of the first plurality of apertures is different from a second diameter of each of the second plurality of apertures. Each of the first and second diameters is dimensioned in accordance with respective ones of the different operating current requirements.

In some embodiments, the first cartridge jacket has a first axial length configured to cover one or more of a plurality of shield gas apertures in the torch body, and the second cartridge jacket has a second axial length configured to cover one or more of the plurality of shield gas apertures in the torch body. In some embodiments, the first axial length is different from the second axial length to cover different numbers of the plurality of shield gas apertures in the torch body for achieving the different operating current requirements.

In some embodiments, the nozzle of the selected consumable cartridge is configured to axially and radially align the selected consumable cartridge relative to the torch body.

In some embodiments, the shield of the selected consumable cartridge includes a plurality of shield gas apertures disposed circumferentially about a proximal end of the shield. Each shield gas aperture is shaped to channel, meter, and swirl a shield gas flow traveling therethrough toward a shield exit orifice. In some embodiments, a diameter of the shield gas apertures is dimensioned to support the operating current requirement associated with the selected consumable cartridge.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention provides a liquid-cooled plasma arc torch that includes a liquid-cooled consumable cartridge for removable attachment to a torch body. In some embodiments, the consumable cartridge is a unitary component where the components of the cartridge are not individually serviceable or disposable. Thus, if one component of the consumable cartridge needs to be replaced, the entire cartridge is replaced. In some embodiments, the consumable cartridge has a singular part identification. In some embodiments, the consumable cartridge is a "single use" cartridge, where the cartridge is replaced by the operator after any of the components thereof reaches the end of its service life rather than repairing and replacing the individual consumables like in traditional torch designs. In some embodiments, the cartridge is replaced after a single session, which can involve multiple arcs. In some embodiments, the cartridge is replaced after a single arc event.

Figure 1:
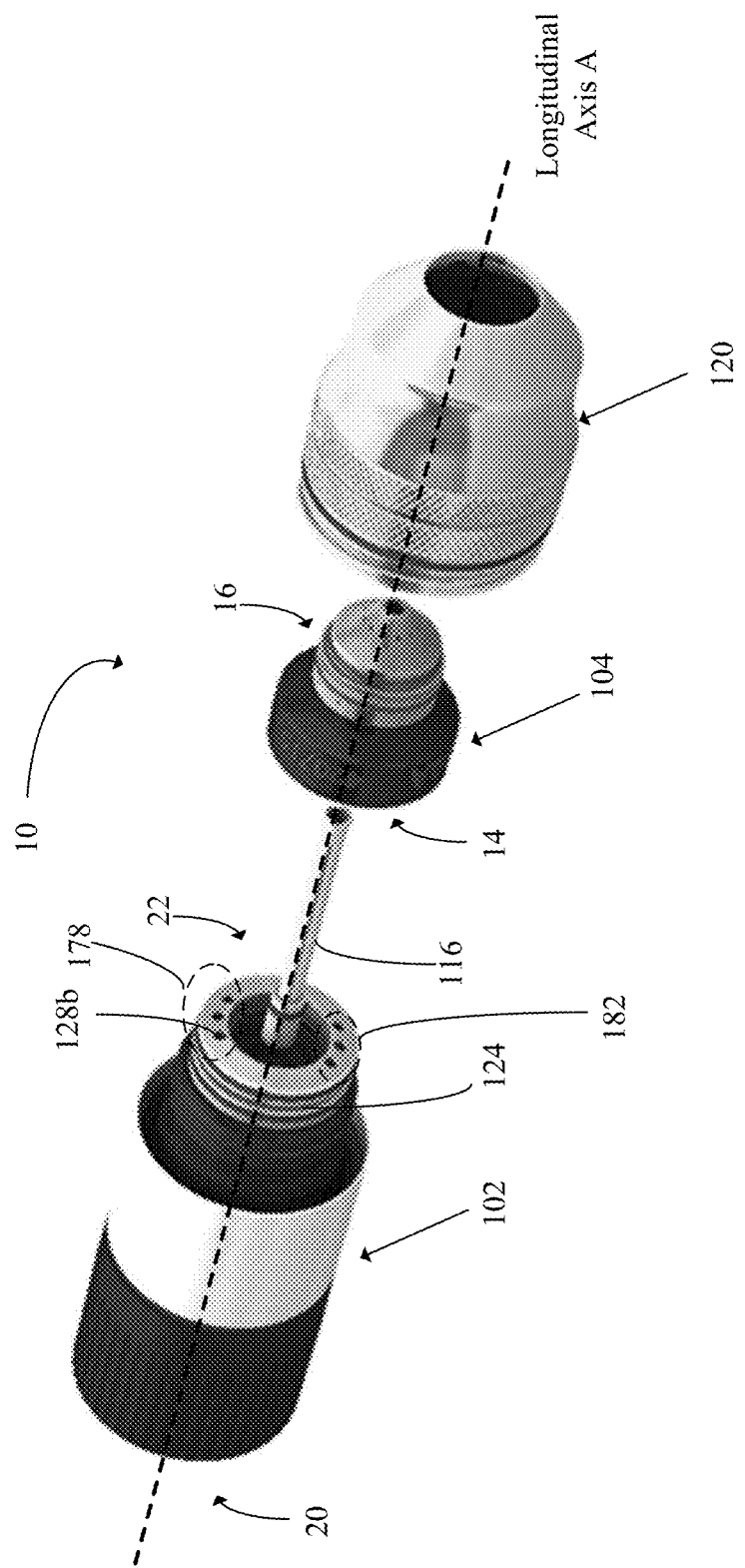
FIG. 1 shows an exploded view of a liquid-cooled plasma arc torch generally comprising a torch body and a cartridge, according to some embodiments of the present invention.

FIG. 1 shows an exploded view of a liquid-cooled plasma arc torch 10 generally comprising a torch body 102 and a cartridge 104, according to some embodiments of the present invention. The cartridge 104, which includes a plurality of consumable torch components, has a proximal end (region) 14 and a distal end (region) 16 along a central longitudinal axis A of the plasma arc torch 10. The torch body 102 has a proximal end (region) 20 and a distal end (region) 22 along the longitudinal axis A. Hereinafter, a proximal end of a component defines a region of the component along the longitudinal axis A that is away from a workpiece when the torch 10 is used to process the workpiece, and a distal end of the component defines a region of the component that is opposite of the proximal end and close to the workpiece when the torch 10 is used to process the workpiece.

In some embodiments, the proximal end 14 of the cartridge 104 matingly and removably engages to and/or disengages from the distal end 22 of torch body 102 without usage of a tool. For example, the tool-less engagement between the torch body 102 and the cartridge 104 can comprise inserting a central coolant tube 116 of the torch body 102 into an electrode (not shown) of the cartridge 104 and coupling the proximal end 14 of the cartridge 104 to the distal end 22 of the torch body 102 via one of a push motion, threading, interference fit, snap fit, quick lock, etc. Thereafter, an outer cap 120 can be disposed over the combination of the cartridge 104 and the torch body 102 to retain their engaged position. For example, the outer cap 120 can be threaded over the cartridge 104 onto the torch body 102. In some embodiments, the outer cap 120 comprises an outer shell 120a (e.g., made from an electrically conductive material such as brass) and an inner liner 120b (e.g., made from an electrically insulating material such as plastic). As shown in FIG. 1, the component counts and part numbers for the plasma arc torch 10 are reduced, which facilitates installation/uninstallation of torch consumables for an end user while reducing the likelihood of improper torch setup.

Figure 2:
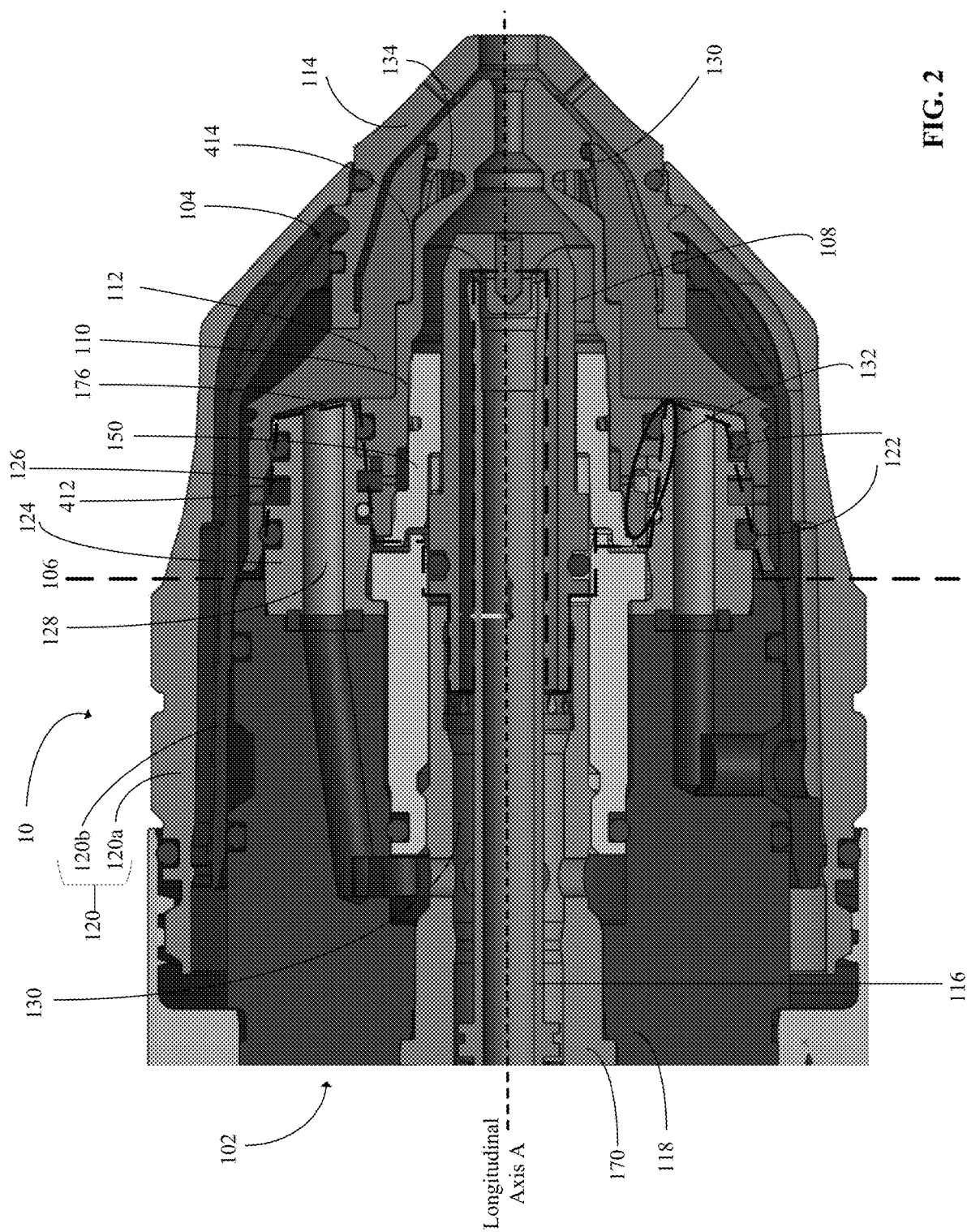
FIG. 2 shows a cross-sectional view of a portion of the assembled plasma arc torch, including the cartridge, of FIG. 1, according to some embodiments of the present invention.

FIG. 2 shows a cross-sectional view of a portion of the assembled plasma arc torch 10, including the cartridge 104, of FIG. 1, according to some embodiments of the present invention. As shown, an interface 106 in FIG. 1 defines the boundary between the cartridge 104 and the torch head 102 after they are engaged to each other. The cartridge 104, which is a substantially unitary element, includes an electrode 108 (i.e., an arc emitter), a nozzle 110 (i.e., an arc constrictor), a jacket 112, and a shield 114 disposed concentrically about the central longitudinal axis A. In some embodiments, the cartridge 104 also includes a swirl ring 150 disposed about the longitudinal axis A. Details regarding the cartridge 104 are described below in relation to FIGS. 3a and 3b. In the engaged position between the torch body 102 and the cartridge 104 as shown in FIG. 2, the outer cap 120 can be disposed over a portion of the shield 114 of the cartridge 104 and threaded into the distal end 22 of the torch body 102 to retain the cartridge 104 against the torch body 102.

The torch body 102 includes a torch insulator 118 that can be made from an electrically insulating material, such as plastic. The torch insulator 118 can couple to a number of components of the torch body 102, including a cathode 170 and a torch connector 124. For example, the torch insulator 118 can define a central channel within which the cathode 170 is disposed and coupled to. Upon engagement between the torch body 102 and the cartridge 104, the distal end of the cathode 170 is configured to electrically and/or physically couple to the proximal end of the electrode 108 of the cartridge 104 to form a housing for encasing the coolant tube 116 of the torch body 102. In some embodiments, the distal end of the torch insulator 118 is configured to couple to the torch connector 124. As shown, the torch connector 124 defines a plurality of apertures 126 circumferentially disposed into an exterior surface of the connector 124 for metering a shield gas flow from the torch body 102 to the cartridge 104 upon engagement. Each aperture 126 can be oriented substantially perpendicular to the longitudinal axis A. In some embodiments, the torch connector 124 also defines a plurality of axial channels 128 circumferentially dispersed inside of the body of the connector 124 for circulating a liquid coolant flow between the torch body 102 and the cartridge 104 upon engagement. Each axial channel 128 can be oriented substantially parallel to the longitudinal axis A. As shown in FIG. 1, the axial channels 128 can be divided into two groups, with a first group 178 of one or more axial channels 128 located on one side of the torch body 102 and the second group 182 of one or more axial channels 128 located on substantially the opposite side that are radially offset relative to the first group 178 by about 180 degrees. Each group of axial channels 128 is adapted to convey a coolant flow either into the torch body 102 or away from the torch body 102. Each axial channel 128 can have a distal opening 128*b* that is on the distal end face of the connector 124.

Figure 3A:
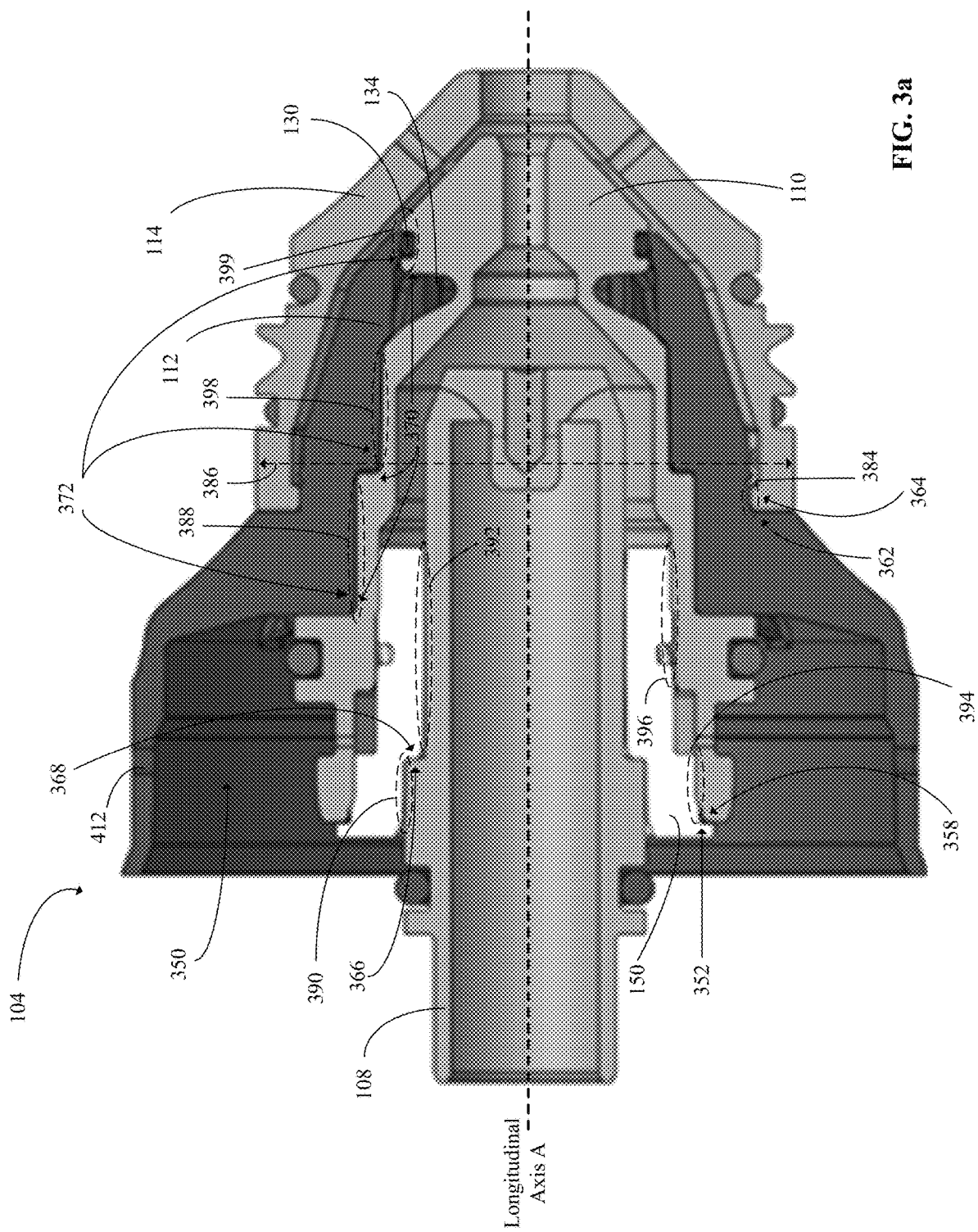
FIGS. 3a and 3b show a cross-sectional profile view and an exterior profile view, respectively, of an exemplary configuration of the cartridge of FIG. 2, according to some embodiments of the present invention.
Figure 3B:
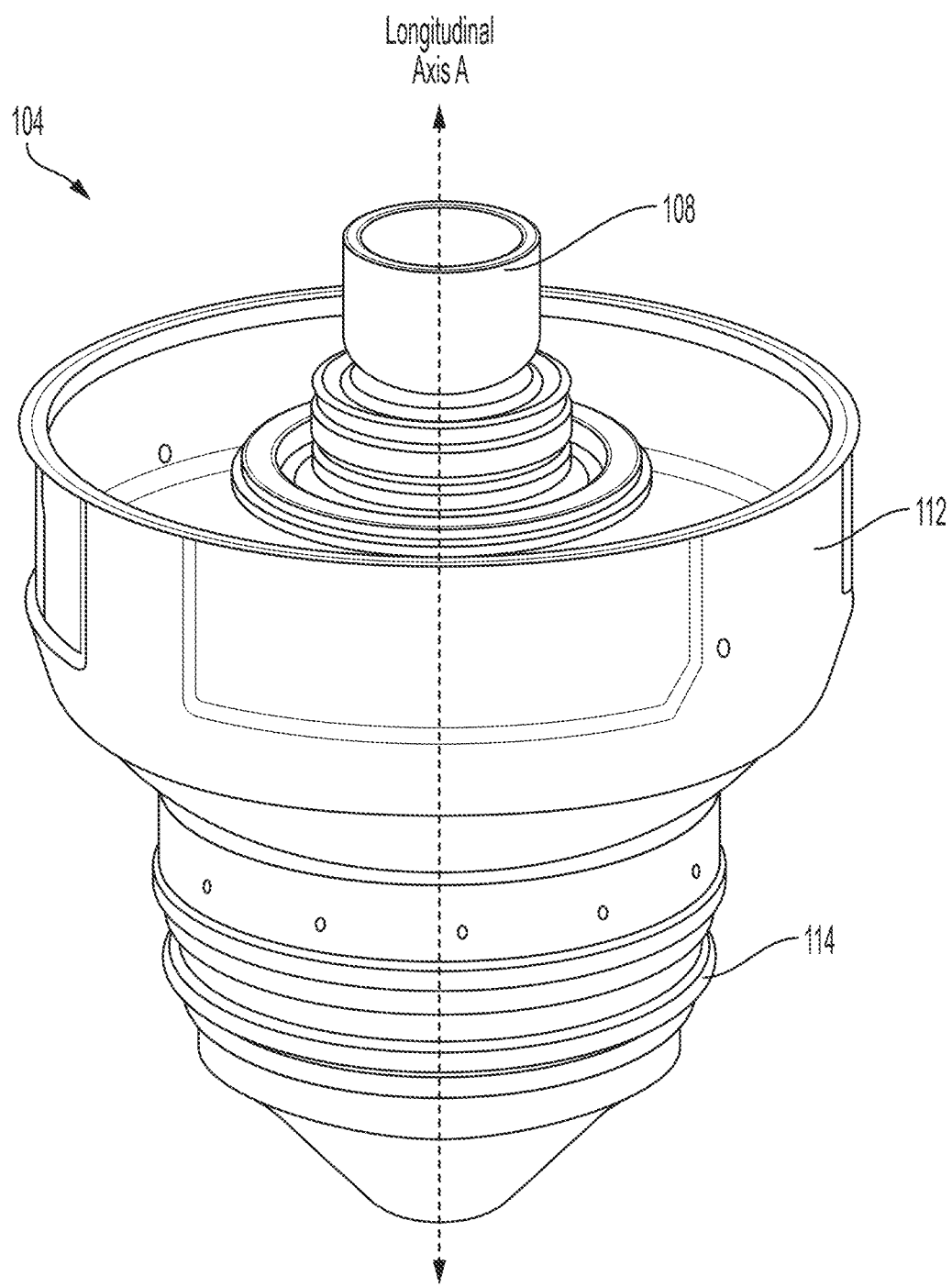

FIGS. 3*a* and 3*b* show a cross-sectional profile view and an exterior profile view, respectively, of an exemplary configuration of the cartridge 104 of FIG. 2, according to some embodiments of the present invention. As described above, the cartridge 104 can generally include the electrode 108, nozzle 110, jacket 112, shield 114 and swirl ring 150 concentrically disposed about the longitudinal axis A of the plasma arc torch 10. In general, the various components of the cartridge can be secured, either directly or indirectly, to the cartridge jacket 112 while achieving axial alignment and radial alignment (i.e., centering) relative to the central longitudinal axis A.

In some embodiments, an outer diameter of the electrode 108 is inserted through an inner diameter of the swirl ring 150. In this position, the swirl ring 150 is matingly and securely affixed to and disposed circumferentially about an exterior surface of the distal end of the electrode 108. More specifically, the electrode 108 includes an outer retaining feature 366 (e.g., one or more steps of varying diameter of the electrode 108) on its exterior surface configured to securely engage an inner retaining feature 368 (e.g., one or more complementary steps or protrusions) on an interior surface of the swirl ring 150 to prevent axial movement of the electrode 108 and the swirl ring 150 relative to each other as well as radially align/center the components relative to each other. In some embodiments, the secure affixation between the swirl ring 150 and the electrode 108 is only achieve when the nozzle 110 is disposed circumferentially over the swirl ring 150, thereby applying an external pressure on the engagement between the swirl ring 150 and the electrode 108. The mating between the electrode 108 and the swirl ring 150 can result in two distinct circumferential interfaces 390, 392 (i.e., alignment surfaces) between the interior surface of the swirl ring 150 and the exterior surface of the electrode 108.

In some embodiments, an outer diameter of the swirl ring 150 is matingly and securely affixed to an inner diameter of the nozzle 110. As shown, the nozzle 110 can be circumferentially disposed about the distal end of the electrode 108 with at least a portion of the swirl ring 150 located therebetween. More specifically, the swirl ring 150 can be secured to the nozzle 110 by matingly engaging at least one retaining feature 352 (e.g., a step of varying diameter of the swirl ring 150) on an exterior surface of the swirl ring 150 with an inner retaining feature 358 (e.g., a complementary step or protrusion of the nozzle 110) on an interior surface of the nozzle 110 to prevent axial movement of the swirl ring 150 and the nozzle 110 relative to each other as well as radially align/center the components relative to each other. In some embodiments, the mating between the swirl ring 150 and the nozzle 110 results in two distinct circumferential interfaces 394, 396 (i.e., alignment surfaces) between the exterior surface of the swirl ring 150 and the interior surface of the nozzle 110.

In some embodiments, an outer diameter of the nozzle 110 is matingly and securely affixed to an inner diameter of the cartridge jacket 112. As shown, the cartridge jacket 112 can be securely affixed to and circumferentially disposed about the distal end of the nozzle 110, which in turn securely affixes the swirl ring 150 and the electrode 108 to the cartridge jacket 112. The nozzle 110 can be secured to the cartridge jacket 112 by matingly and securely engaging one or more outer retaining features 370 (e.g., one or more steps of varying diameter of the nozzle 110) on an exterior surface of the nozzle 110 to one or more inner retaining features 372 (one or more complementary steps or protrusions of the jacket 112) on an interior surface of the jacket 112 to prevent axial movement of the nozzle 110 and the cartridge jacket 112 relative to each other as well as radially align/center the components relative to each other. In some embodiments, the retaining features 370 can also include a seal (e.g., an O-ring seal) 130 located between the interior surface of the distal end of the jacket 112 and a corresponding exterior surface of the nozzle 110. The seal 130 is configured to further affix the jacket 112 to the nozzle 110 as well as serve an additional function of preventing leakage of a liquid coolant between the two components. The mating between the retaining features 370, 372 can result in three distinct circumferential interfaces 388, 398, 399 (i.e., alignment surfaces) between the exterior surface of the nozzle 110 and the interior surface of the jacket 112.

In some embodiments, an outer diameter of the cartridge jacket 112 is matingly and securely affixed to an inner diameter of the shield 114. As shown, the shield 114 is circumferentially disposed about the distal end of the cartridge jacket 112. More specifically, an outer retaining feature 362 (e.g., a step of varying diameter of the cartridge jacket 112) on an exterior surface of the cartridge jacket 112 securely affixes/engages to an inner retaining feature 364 (e.g., a complementary step or protrusion of the shield 114) on an interior surface of the shield 114 to prevent axial movement of the cartridge jacket 112 and the shield 114 relative to each other as well as radially align/center the components relative to each other. For example, the retaining feature 362 on the cartridge jacket 112 can include an indentation disposed circumferentially about an exterior surface configured to receive a protruding portion 364 of the distal end of the shield 114. The mating between the retaining features 362, 364 can result in at least one circumferential interface 384 (i.e., alignment surface) between the exterior surface of the jacket 112 and the interior surface of the shield 114.

In some embodiments, the retaining features 366, 368, 352, 358, 370, 372, 362, 364 described above can mate with their corresponding retaining features through one of snap fit, press fit, interference fit, crimping, frictional fitting, gluing, cementing or welding. In some embodiments, the retaining features include one or more sealing o-rings or gaskets, made of hardening epoxy or rubber for example. In some embodiments, the secure affixation/engagement of the various components of the cartridge 104 is permanent for the useful life of a cartridge 104 to prevent the individual components of the cartridge 104 from individually replaceable or serviceable. For example, the permanent affixation/engagement of the components in the cartridge 104 can (i) render the cartridge 104 non-disassemblable and/or (ii) cause permanent damage to the individual components upon disassembly.

As shown in FIG. 3a, upon final assembly and securement of the consumable components within the cartridge 104, the proximal end of the cartridge jacket 112 is adapted to extend axially past the proximal end of the shield 114 in the proximal direction along the longitudinal axis A. The proximal end of the electrode 108 is adapted to extend axially past the proximal end of the jacket 112 in the proximal direction along the longitudinal axis A. Radially, the proximal end of the cartridge jacket 112 is adapted to extend beyond the maximum radial extent 386 of the shield 114. In some embodiments, an axial length of the cartridge jacket 112 is greater than an axial length of at least one of the nozzle 110, the shield 114 or the electrode 108. In some embodiments, a ratio of the axial length of the cartridge 104 (i.e., from the proximal end of the electrode 108 to the distal end of the shield 114) to a radial width of the cartridge 104 (i.e., the outer diameter of the jacket 112) is less than about 1.25.

Figure 4A:
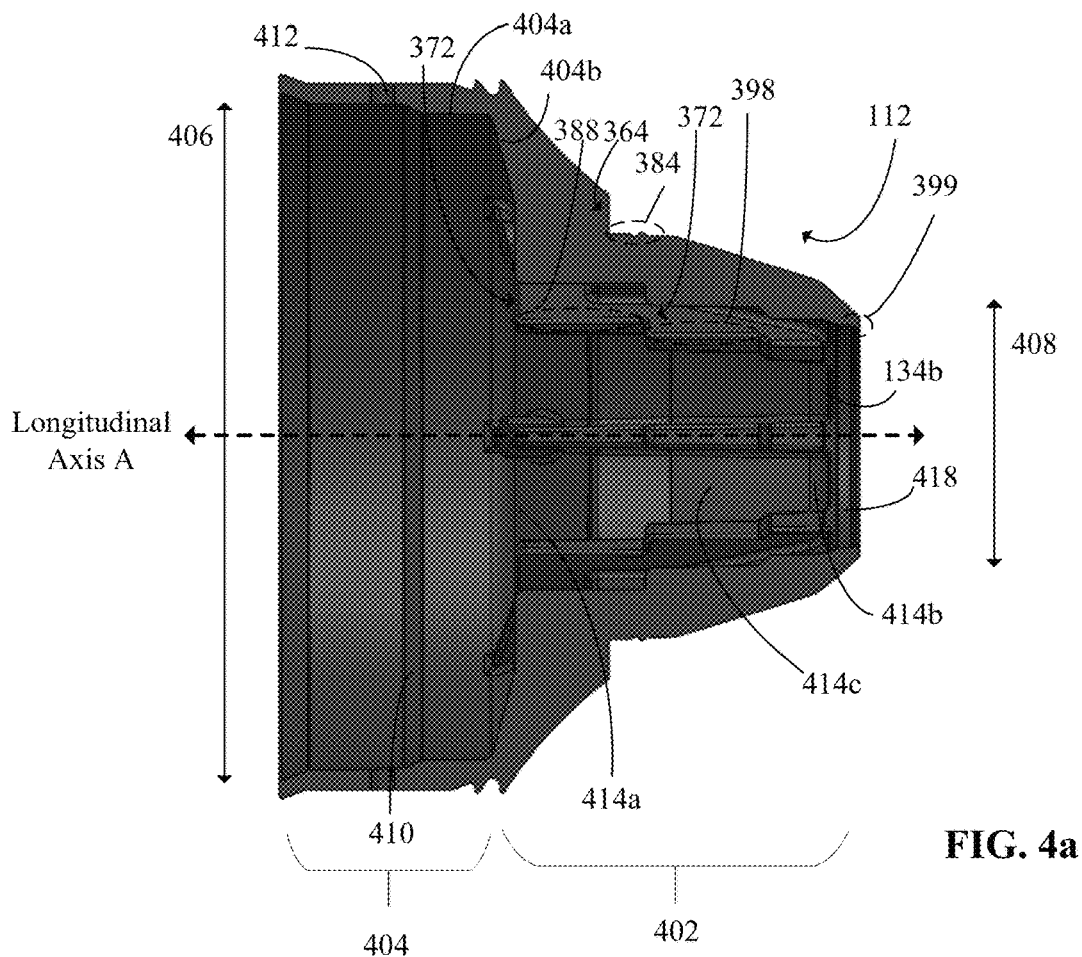
FIGS. 4a and 4b show a cross-sectional profile view and an exterior profile view, respectively, of an exemplary configuration of the cartridge jacket of the cartridge of FIG. 2, according to some embodiments of the present invention.
Figure 4B:
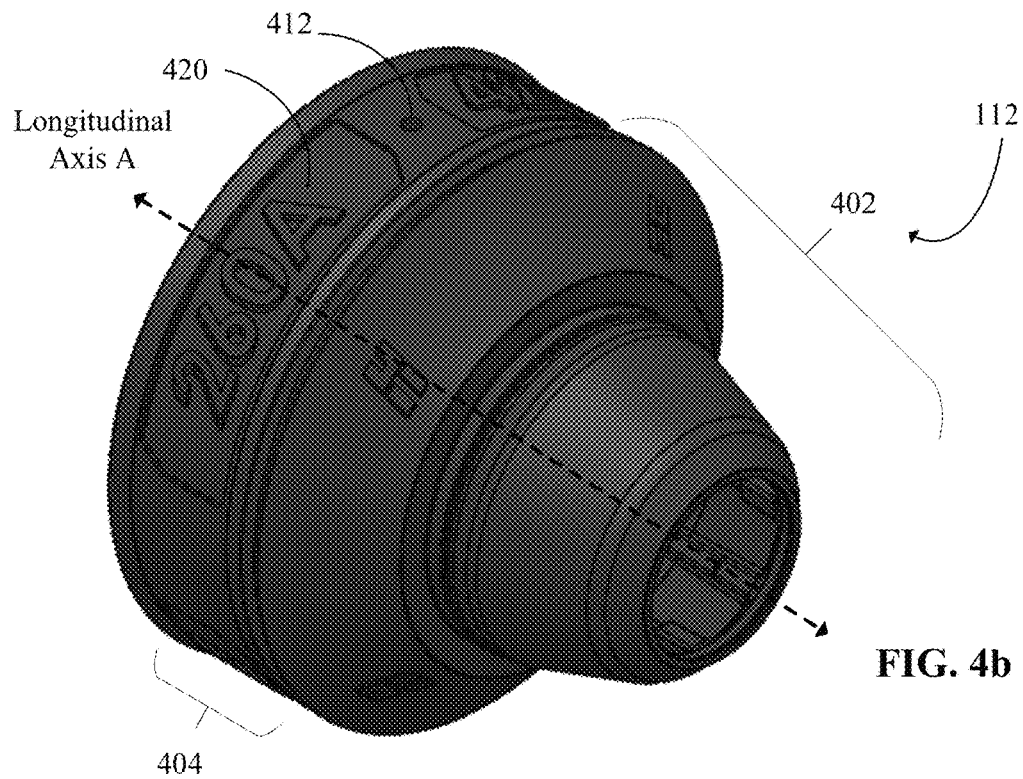

FIGS. 4a and 4b show a cross-sectional profile view and an exterior profile view, respectively, of an exemplary configuration of the cartridge jacket 112 of the cartridge 102 of FIG. 2, according to some embodiments of the present invention. The cartridge jacket 112 includes an electrically insulating hollow body with the longitudinal axis A of the plasma arc torch 10 extending therethrough. For example, the cartridge jacket 112 can be made from an injection moldable plastic material that is electrically non-conductive. In some embodiments, the material is Radel, which is a tough injection moldable high-performance material. Thus, the cartridge jacket 112 can be manufactured using an injection molding technique. In some embodiments, because the cartridge jacket 112 is concentrically disposed between the nozzle 110 and the shield 114 as described above with reference to FIGS. 3a and 3b, the jacket 112 is adapted to provide physical separation and electrical isolation between the nozzle 110 and the shield 114.

As shown, the cartridge jacket 112 generally includes a distal end 402 and a proximal end 404 along the longitudinal axis A of the plasma arc torch 10. Both the distal end 402 and the proximal end 404 can be substantially hollow and frustoconical in shape, where a radial extent (e.g., outer diameter) 406 of the hollow body of the proximal end 404 is larger than the radial extent (e.g., outer diameter) 408 of the hollow body of the distal end 402. In some embodiments, the ratio of the axial length of the cartridge jacket 112 to the radial extent 406 of the proximal end 404 of the cartridge is about 0.7. In some embodiments, the ratio of the axial length of the cartridge jacket 112 to the radial extent 408 of the distal end 402 is between about 1.4 to about 1.6, depending on the operating current (e.g., between about 260 amps to about 80 amps, respectively). Further, the proximal end 404 of the jacket 112 can be defined by a circumferential body portion 404a and a stepped/slanted inner wall portion 404b that bridges the transition between the wider proximal end 404 and the narrower distal end 402 of the jacket 112.

In some embodiments, with respect to shield and nozzle coupling and alignment, at least a portion of the distal end 402 of the jacket 112 is configured to extend into the proximal end of the shield 114 to matingly and securely engage the shield 114 over the circumferential exterior alignment interface/surface 384 via the exterior retention feature 364. The exterior circumferential alignment interface 384 of the cartridge jacket 112 is adapted to provide both axial and radial alignment of the shield 114 relative to the jacket 112. In some embodiments, the exterior circumferential alignment interface 384 is also adapted to establish a relative tight fluid seal once assembled inside of the cartridge 104. In addition, the distal end 402 of the jacket 112 includes at least three interior retention features 372 for matingly and securely engaging the nozzle 110 over the circumferential interior alignment interface/surfaces 388, 398, 399. These interior alignment interfaces 388, 398, 399 are adapted to axially and radially align the nozzle 110 relative to the cartridge jacket 112. In some embodiments, the interior alignment interfaces 388, 398, 399 of the jacket 112 also establish relative tight fluid seals at their respective locations once assembled inside of the cartridge 104. Thus, the cartridge jacket 112 can axially and radially align the nozzle 110 relative to the shield 114.

In some embodiments, with respect to shield gas flow, a plurality of apertures 412 are circumferentially disposed about the proximal end 404 of the hollow body of the jacket 112. Each aperture 412 is configured to connect an interior surface of the hollow body of the jacket 112 to an exterior surface of the hollow body at the proximal end 404. In some embodiments, each aperture 412 is oriented substantially perpendicular to the longitudinal axis A. Further, each aperture 412 is shaped and sized to meter and channel a shield gas flow from the torch body 102 to the shield 114 via the jacket 112 upon engagement between the torch body 102 and the cartridge 104. More specifically, as shown in FIG. 2, upon engagement between the torch body 102 and the cartridge 104, at least a portion of the torch connector 124 of the torch body 102 is adapted to fit inside a cavity defined by the proximal end of 404 of the cartridge jacket 112, such that the set of apertures 126 on the outer diameter of the connector 124 axially align with the apertures 412 of the proximal end 404 of the jacket 112. This axial alignment allows a shield gas flow from the torch body 102 to travel to the shield 114 via the apertures 126 of the connector 124 and the apertures 412 of the jacket 112.

In some embodiments, a diameter of the each aperture 412 is dimensioned in accordance with an operating current requirement of the cartridge 104. Thus, different cartridges 104 that are intended for different operating currents can have different sized apertures 412. For example, a shield flow pressure of the cartridge 104 can be predefined, and the apertures are sized to provide the optimal cutting performance for each cutting at the predefined shield flow pressure. Details regarding shield gas flow inside of the plasma arc torch 10 will be described below with respect to FIG. 9. In some embodiments, the diameter of each aperture 412 varies from about 0.040 inches to about 0.055 inches based on the amperage of the operating current. In some embodiments, the shape (i.e. radius) of the apertures 412 also influences the flow rate of the shield gas therethrough.

In addition, the interior surface of the proximal end 404 of the jacket 112 can define one or more circumferential grooves 410 (shown in FIG. 4a) for housing and/or receiving respective ones of a flexible seal 122 (shown in FIG. 2) that provides a relatively tight fluid seal between the exterior surface of the connector 124 of the torch body 102 and the interior surface of the proximal end 404 of the jacket 112. For example, two flexible seals 122 can be placed on either side of the apertures 126 and 412 to direct a radial shield gas flow through these apertures. The seals 122 can also prevent liquid coolant leakage when a liquid coolant axially flows between the axial channels 128 of the connector 124 and the jacket 112, which will be described in detail below. In some embodiments, the proximal end 404 of the cartridge jacket 112, including the seals 122, establishes a flexible, non-rigid engagement of the jacket 112 with the torch body 102 (i.e., at the outer diameter of the torch connector 124 of the torch body 102) without driving any axial and/or radial alignment between the torch body 102 and the cartridge 104.

In some embodiments, with respect to liquid coolant flow, a plurality of axial coolant flow passages 414 are formed between the interior surface of the distal end 402 of the jacket 112 and the corresponding exterior surface of the nozzle 110. The flow passages 414 comprise a plurality of axial slots 414c disposed/etched into the interior surface of the distal end 402 of the jacket 112 and interspersed circumferentially around the hollow body of the distal end 402. Upon engagement of the nozzle 110 and the jacket 112, the axial slots 414c are configured to complement an external profile of the nozzle 110 that is located inside of the hollow body of the jacket 112 to cooperative define the respective liquid coolant passages 414 between the nozzle 110 and the jacket 112. As shown in FIG. 4a, each axial channel 414 can have a proximal opening 414a that is in fluid communication with a circumferential channel 176 (shown in FIG. 2) defined at least in part by the interior of the radial-extensive proximal end 404 of the jacket 112. For example, the circumferential channel 176 can be defined in cooperation with the torch connector 124 once the torch body 102 is coupled to the cartridge 104. The circumferential channel 176 is adapted to fluidly connect one or more of the proximal openings 414a of the axial channel 414 in the cartridge 104 with one or more of the distal openings 128b of the axial channels 128 disposed in the torch connector 124 that is located in the proximal end 404 of the jacket 112 for conveyance of a liquid coolant flow to and from the torch body 102. In some embodiments, the axial channels 414 of the cartridge 104 are circumferentially and evenly distributed in the cartridge 104 such that (i) at least one axial channel 414 is adapted to be in fluid communication with at least one of the first group 178 of axial channels 128 in the torch connector 124 and (ii) at least another one of the axial channels 414 is adapted to be in fluid communication with at least one of the second group 182 of axial channels 128 that are radially opposite from the first group 178 by about 180 degrees. Further, each axial channel 414 also has a distal opening 414b that is in fluid communication with a circumferential channel 134 (shown in FIG. 2) located distal to the distal openings 414b of the coolant passages 414, where the circumferential channel 134 can extend about 360 degrees around the nozzle 110. The circumferential channel 134 can be cooperatively defined by a circumferential slot 134a disposed/etched into the exterior surface of the nozzle 110 and a corresponding circumferential interior surface 134b of the jacket 112. The circumferential channel 134 permits circulation of a coolant to flow around the exterior surface of the end of the nozzle 110 after the coolant flow exits from the coolant passages 414, thereby promoting convective cooling of the nozzle end during torch operation and reducing stagnation of the flowing liquid. In general, the combination of the axial coolant passages 414 and the circumferential coolant channel 134 enhances cooling of at least a portion of the nozzle 110 that is located inside of the jacket 112.

In some embodiments, the fluid-tight seal 130 (shown in FIG. 2) between the interior surface of the proximal end of the jacket 112 and the exterior surface of the nozzle 110 is located immediately distal to the circumferential channel 134. As described above, the seal 130 is configured to not only affix the jacket 112 to the nozzle 110 to form the alignment surface 399, but also to prevent leakage of the liquid coolant from the coolant passages 414 and the circumferential coolant channel 134 in the distal direction. In addition, the seals 122 between the torch connector 124 and the proximal end 404 of the cartridge jacket 112 prevent leakage of the liquid coolant from the coolant passages 414 in the proximal direction, in addition to providing a flexible engagement interface between the torch body 102 and the cartridge 104. Details regarding liquid coolant flow inside of the plasma arc torch 10 will be described below with respect to FIG. 10.

In some embodiments, with respect to the alignment between the torch body 102 and the cartridge 104 upon engagement, the cartridge jacket 112 is configured to enable the nozzle 110 of the cartridge 104 to achieve and/or primarily guide such an alignment. In particular, the proximal end 404 of the jacket 112 defines a cavity 350 in cooperation with a proximal portion of the nozzle 110 extending within the proximal end 404 of the jacket 112, as shown in FIG. 3a. The cavity 350 is bounded radially by the circumferential body 404a of the proximal end 404 of the jacket 112 and the outer profile of the nozzle 110 extending inside of the proximal end 404. The cavity 350 is bounded axially by the stepped inner wall 404b of the proximal end 404. When installing the cartridge 104 onto the distal end 22 of the torch body 102, the coolant tube 116 of the torch body 102 is adapted to be inserted into the central cavity of the electrode 108 of the cartridge 104 while the torch connector 124 of the torch body 102 is inserted into the cavity 350 within the proximal end 404 of the jacket 112 of the cartridge 104. Upon engagement, the outer diameter of the connector 124 is flexibly engaged to the circumferential body 404a of the proximal end 404 via the one or more flexible seals 122 while the inner diameter of the connector 124 is rigidly engaged to the outer profile of the portion of the nozzle 110 in the proximal end 404. This rigid engagement to the nozzle 110 creates a circumferential interface/surface 132 therebetween, as shown in FIG. 2, which drives the axial and radial alignment between torch body 102 and the cartridge 104.

In some embodiments, because the proximal end 404 of the cartridge jacket 112 is exposed upon assembly of the cartridge 104 (as shown in FIG. 3b), where the proximal end 404 extends both axially and radially beyond the coverage of the shield 114, the exterior surface of the proximal end of the cartridge jacket 112 can be marked with useful information to aid the end user. For example, as shown in FIG. 4b, the exterior surface of the proximal end 404 can be marked in large and raised lettering to indicate the current amperage 420 at which the corresponding cartridge 104 should be operated and/or the singular part number assigned to the cartridge 104. Further, such large and raised lettering (and/or additional raised features) provides a gripping surface for the end user during installation/uninstallation of the cartridge 104 relative to the torch body 102, which is compatible with a tool-less installation/uninstallation process. For example, the end user can simply push the cartridge 104 onto the distal end 22 of the torch body 102 for installation and pull the cartridge 104 away from the distal end 22 of the torch body 102 for uninstallation. Without these gripping features, the cartridge 104 can be slippery when wet, especially with the usage of a liquid coolant, which may impede cartridge installation and/or removal by hand. Moreover, because the exposed proximal end 404 of the cartridge jacket 112 is constructed from a non-electrically-conductive material, the proximal end 404 offers electrical insulation and protection to the end user during the tool-less installation/uninstallation process.

As described above and herein, the cartridge jacket 112 of the present invention provides a multitude of functions in a compact design that improve both torch operations and torch usability. Operational functionalities provided by the cartridge jacket 112 include, but are not limited to, radial and axial alignment of the shield 114 relative to the nozzle 110, alignment and retention of the nozzle 110 and the shield 114 while establishing relatively tight fluid seals at their respective interfaces, enabling the nozzle 110 located inside of the cartridge jacket 112 to drive the alignment of the cartridge 104 relative to the torch body 102, directing a liquid coolant flow between the torch body 102 and the nozzle 110 via the axial channels 414 for extensive cooling of the nozzle 110, shield gas metering via the set of apertures 412 to control the gas flow, and establishment of electrical isolation between the shield 114 and the nozzle 110. Usability functions provided by the cartridge jacket 112 include, but are not limited to, establishing a gripping surface for tool-less installation/uninstallation of the cartridge 104 relative to the torch body 102, end user protection by extending electrical insulation beyond the proximal end of the shield 114, and visible cartridge identification. In general, the jacket 112 incorporates into a single component a number of complex features and tight tolerance requirements that are traditionally distributed across many consumable components in a typical plasma arc torch. This reduction is adapted to reduce manufacturing costs and assembly concerns.

Figure 5:
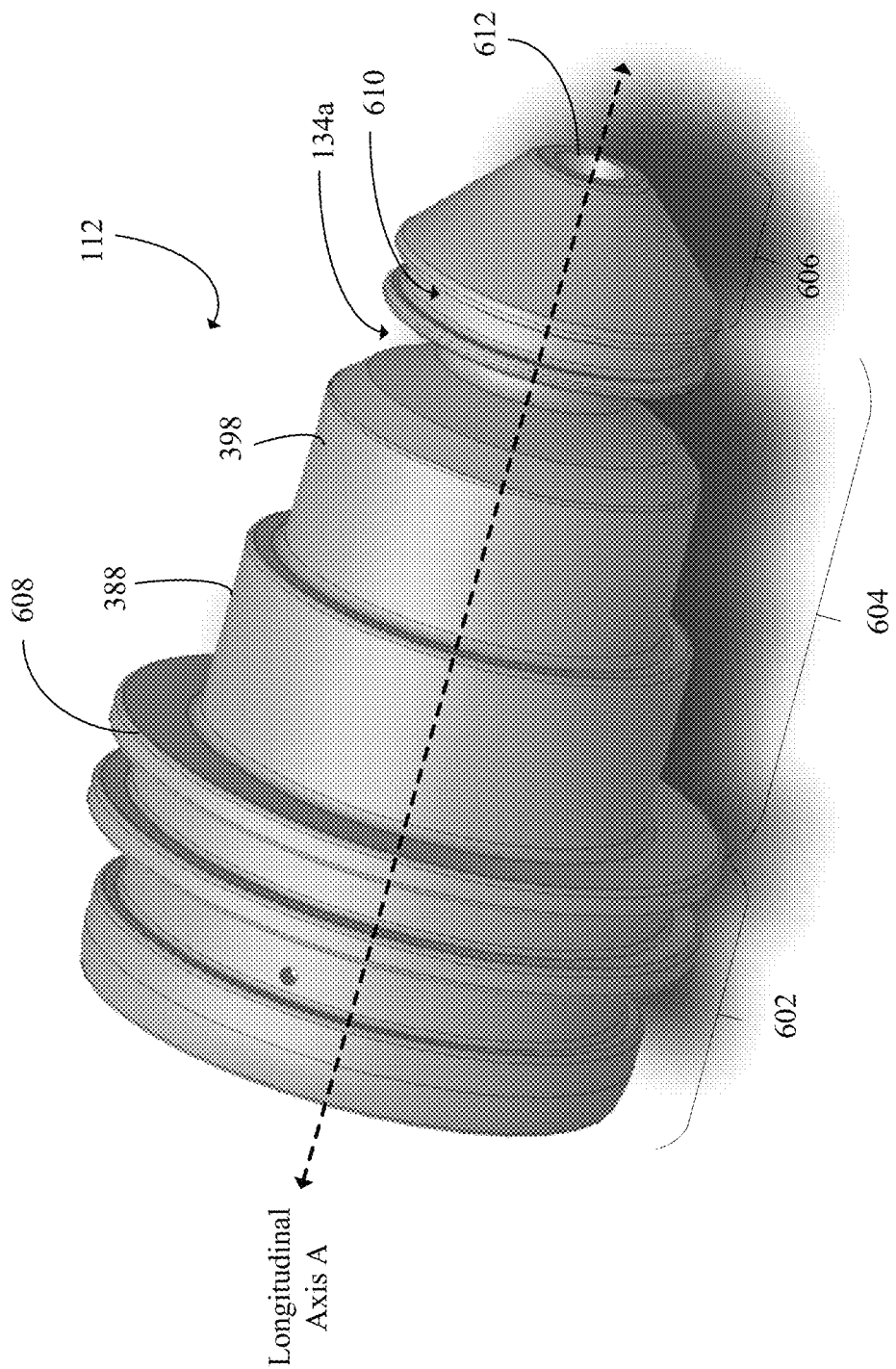
FIG. 5 shows an exterior profile view of an exemplary configuration of the nozzle of the cartridge of FIG. 2, accordingly to some embodiments of the present invention.

FIG. 5 shows an exterior profile view of an exemplary configuration of the nozzle 110 of the cartridge 104 of FIG. 2, accordingly to some embodiments of the present invention. As shown, the nozzle 110 has a substantially hollow body and generally comprises a proximal end 602, a middle section 604 and a distal end 606 extending along the longitudinal axis A of the plasma arc torch 10. The nozzle 110 can be constructed from an electrically conductive material, such as copper.

The proximal end 602 of the nozzle 110 is adapted to extend and suspend within the proximal end 404 of the cartridge jacket 112 upon assembly of the cartridge 104, as shown in FIG. 3a. In particular, a radial flange 608 extending from an exterior surface of the proximal end 602 is adapted to abut the stepped inner wall portion 404b of the proximal end 404 of the jacket 112 to prevent axial advancement of the proximal end 602 of the nozzle 110 within the jacket 112. In some embodiments, the outer diameter/profile of the proximal end 602 of the nozzle 110 is adapted to matingly and rigidly engage the torch connector 124 of the torch body 102 upon torch assembly, thereby forming the alignment interface/surface 132 that drives the axial and/or radial alignment of the cartridge 104 relative to the torch body 102, as described above.

The middle section 604 of the nozzle 110 is configured to be inserted within distal end 402 of the cartridge jacket 112 such that the distal end 402 of the cartridge jacket 112 substantially surrounds the middle section 604. The middle section 604 is adapted to make contact with the interior surface of the distal end 402 of the jacket 112 at various circumferential interfaces 388, 398, 399, thereby driving the radial and axial alignment of the jacket 112 relative to the nozzle 110. In addition, the external surface/profile of the middle section 604 of the nozzle 110 is adapted to cooperate with the plurality of axial coolant slots 414c disposed into the interior surface of the distal end 402 of the jacket 112 to form the plurality of coolant passages 414 that extend axially over the exterior surface of the middle section 604. In some embodiments, the middle section 604 includes the circumferential slot 134a that is disposed/etched into the exterior surface of the nozzle 110, which in cooperation with the corresponding circumferential interior surface 134b of the jacket 112, defines the circumferential coolant channel 134. In some embodiments, the middle section 604 includes a circumferential groove 610 located immediately distal to the circumferential slot 134a. The circumferential groove 610 is configured to house the seal 130 (shown in FIG. 2) located between the jacket 112 and the nozzle 110 for preventing fluid leakage.

The distal section 606 of the nozzle 110 includes a centrally-located nozzle exit orifice 612 for introducing a plasma arc, such as an ionized gas jet, to a workpiece (not shown) to be cut. The distal section 606 is adapted to axially extend through and beyond the opening of the distal portion 402 of the cartridge jacket 112 upon assembly of the cartridge 104.

Figure 6A:
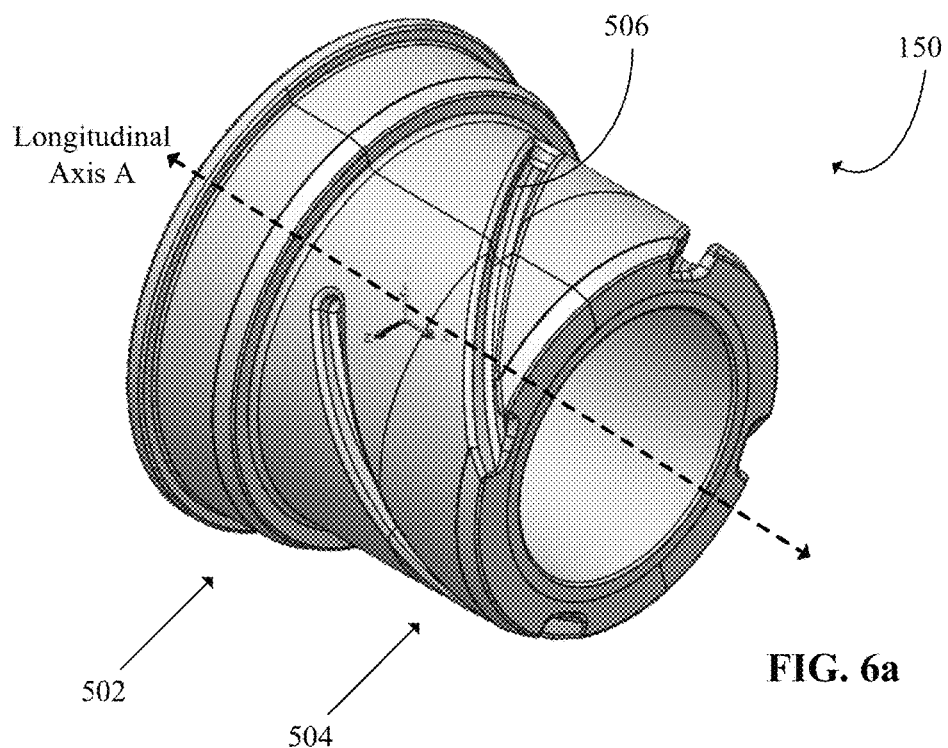
FIGS. 6a and 6b show an exterior profile view and a cross-sectional profile view of an exemplary configuration of the swirl ring of the cartridge of FIG. 2, according to some embodiments of the present invention.
Figure 6B:
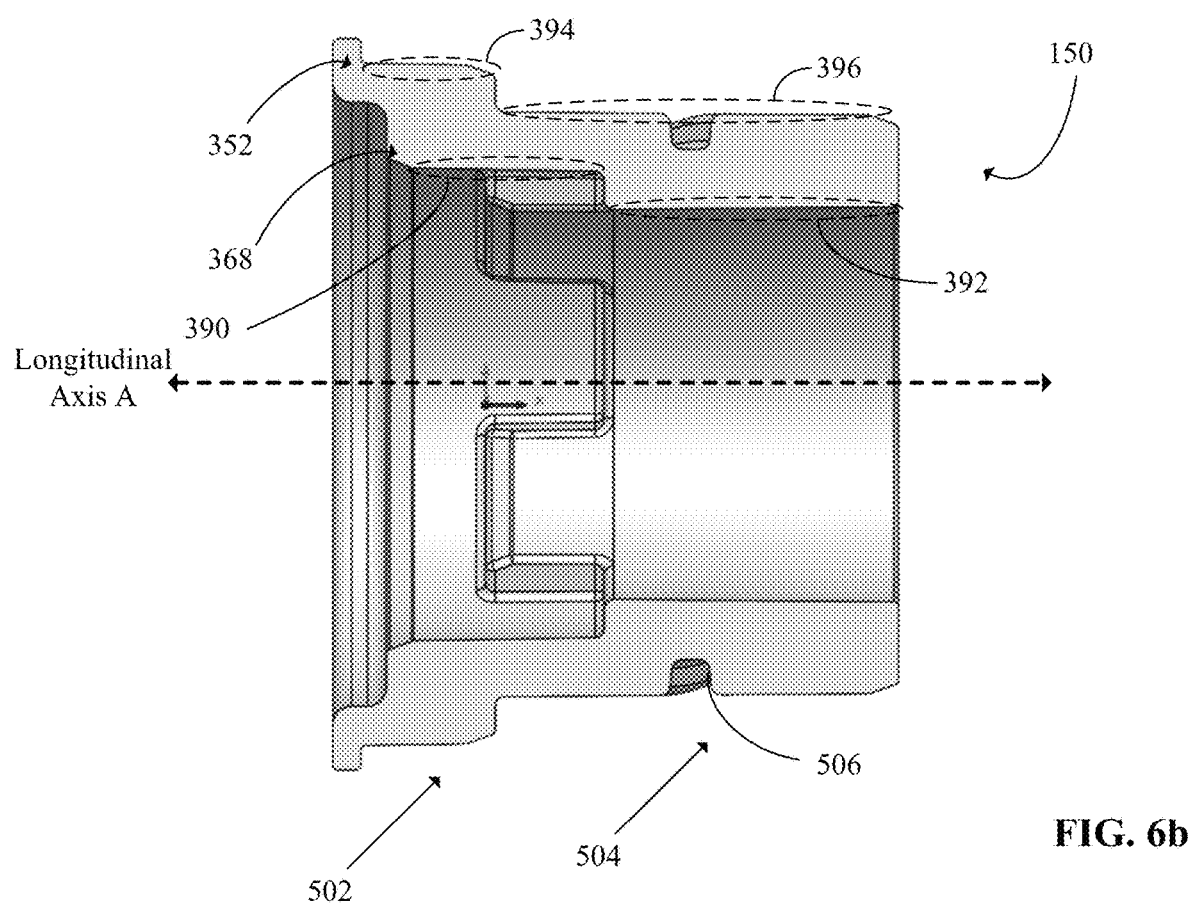

FIGS. 6a and 6b show an exterior profile view and a cross-sectional profile view of an exemplary configuration of the swirl ring 150 of the cartridge 104 of FIG. 2, according to some embodiments of the present invention. As shown, the swirl ring 150 has a substantially hollow, elongated body extending along the longitudinal axis A between a proximal end 502 and a distal end 504. The swirl ring 150 can be constructed from an electrically non-conductive material, such as an injection moldable plastic material (e.g., Randel). Thus, the swirl ring 150 can be manufactured using an injection molding technique.

In some embodiments, the swirl ring 150 includes a plurality of slots 506 formed on the exterior surface of the hollow body at the distal end 504, where the slots 506 are dispersed circumferentially about the swirl ring 150. The slots 506 are shaped to complement an interior profile of the nozzle 110 to define a set of gas swirl passages that are oriented to impart a tangential velocity component to a plasma gas flow traveling between the swirl ring 150 and the nozzle 110. For example, as shown in FIG. 6a, the slots 506 can be canted/twisted to form a swirl pattern on the exterior surface of the swirl ring 150. This swirl creates a vortex that constricts the plasma arc from the electrode 108 and stabilizes the position of the arc on the insert of the electrode 108.

In some embodiments, the hollow body of the swirl ring 150 is dimensioned to receive a least a portion of the electrode 108. As described above with reference to FIGS. 3a and 3b, the swirl ring 150 includes at least one interior retention feature 368 for matingly and securely engaging the electrode 108 over the circumferential interior alignment interfaces/surfaces 390, 392. The swirl ring 150 also includes at least one exterior retention feature 352 for matingly and securely engaging the nozzle 110 over the circumferential exterior alignment interfaces/surfaces 394, 396. Thus, the swirl ring 150 can axially and radially align the nozzle 110 relative to the electrode 108 over the various alignment interfaces/surfaces.

Figure 7:
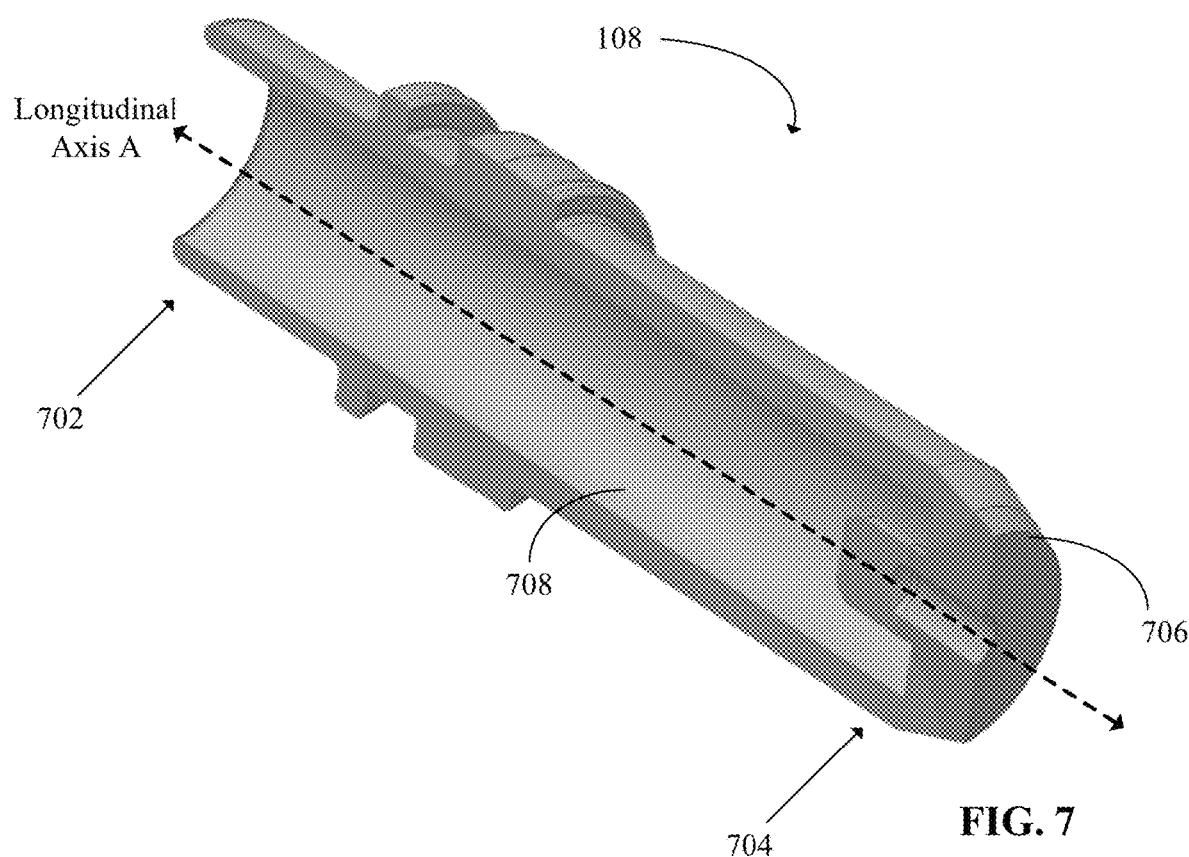
FIG. 7 shows a sectional profile view of an exemplary configuration of the electrode of the cartridge of FIG. 2, according to some embodiments of the present invention.

FIG. 7 shows a sectional view of an exemplary configuration of the electrode 108 of the cartridge 104 of FIG. 2, according to some embodiments of the present invention. As shown, the electrode 108 has an elongated body extending along the longitudinal axis A of the plasma arc torch 10 between a proximal end 702 and a distal end 704. The electrode 108 defines an interior cavity 708 with an opening exposed from the proximal end 702. The interior cavity 708 is configured to house at least a portion of the coolant tube 116 upon torch assembly. An emissive insert 706 can be disposed on the distal end 704 of the electrode 108 so that an emission surface is exposed. The insert 706 can be made of hafnium, silver, and/or other materials that possess suitable physical characteristics, including corrosion resistance and a high thermionic emissivity. In some embodiments, the insert 706 is constructed from silver with a hafnium center. This configuration has several advantages including providing extended cutting by the plasma arc torch 10 and long consumable life for the cartridge 104.

Figure 8:
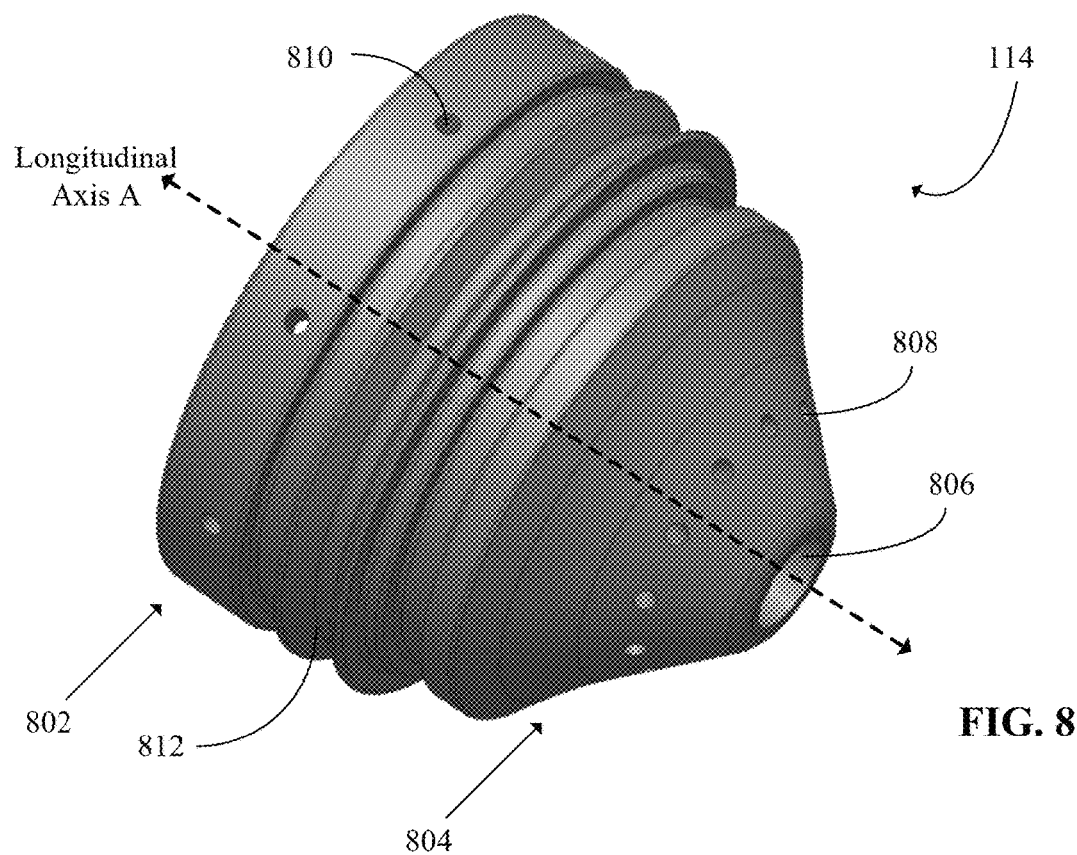
FIG. 8 shows an exterior profile view of the shield of the cartridge of FIG. 2, according to some embodiments of the present invention.

FIG. 8 shows an exterior profile view of the shield 114 of the cartridge 104 of FIG. 2, according to some embodiments of the present invention. The shield 114 comprises a substantially hollow body defining a proximal end 802 and a distal end 804 disposed along the longitudinal axis A of the plasma arc torch 10. The distal end 804 includes a centrally-located shield exit orifice 806 and, optionally, a set of one or more gas vent holes 808 extending from an interior surface to an exterior surface of the shield 114. The shield 114 can be formed from an electrically conductive material, such as copper. As described above, the proximal end 802 of the shield 114 can include the retention feature 364 (shown in FIG. 3a) disposed circumferentially about the interior surface of the proximal end 802. The retention feature 364 is configured to complement the corresponding retention feature 362 of the cartridge jacket 112 to securely engage/affix the shield 114 to the cartridge jacket 112 over the interface 384 (shown in FIG. 3a).

In some embodiments, a set of apertures 810 are disposed circumferentially about the proximal end 802 of the hollow body of the shield 114, where each aperture 810 is configured to connect an exterior surface of the hollow body to an interior surface of the hollow body. Each aperture 810 is sized and shaped to channel, meter, and swirl a shield gas flow traveling therethrough toward the shield exit orifice 806. In some embodiments, eight to ten of these apertures 810 are dispersed around a circumference at the proximal end 802 of the shield 114. In some embodiments, the diameter of each aperture 810 can be about 0.039 inches to about 0.043 inches depending on the operating current. In some embodiments, the apertures 810 are drilled at an offset. The apertures 810 can be machined into the proximal end 802 of the shield 114, such as drilled into the shield body as holes. In some embodiments, the apertures 810 are offset and/or angled to impart a tangential velocity component to the shield gas flow therethrough, thereby creating a swirl pattern in the shield gas flow. In general, the size, number, and/or position of these apertures 810 can be tuned for a specific current amperage to achieve the desired cutting performance Details regarding the shield gas flow through the plasma arc torch 10, including through the shield 114, are provided below in relation to FIG. 9.

In some embodiments, the shield 114 is directly cooled by a liquid coolant flow. More specifically, a circumferential channel 812 can be disposed/etched into the exterior surface of the proximal end 802 of the shield 114 and oriented around (e.g., extending about 360 degrees about) the proximal end 802. The circumferential channel 812 is adapted to circulate a liquid coolant flow around the exterior surface of the shield 114, thereby promoting convective cooling of the shield during torch operation and reducing stagnation of the flowing liquid. In some embodiments, the outer cap 120, after being attached to the outer geometry of the cartridge 104 and the torch body 102, is in fluid communication with the circumferential channel 812 to convey the liquid coolant from the torch body 102 to the shield 114 as well as from the shield 114 to the torch body 102. Details regarding the liquid coolant flow through the plasma arc torch 10, including through the shield 114, are provided below in relation to FIG. 10.

Therefore, the shield 114 combines shield gas swirling (at the apertures 810) with direct liquid cooling (at the circumferential channel 812) in a singular, compact component. Traditionally, shield gas swirling is separate from the shield 114 itself. For example, a separate and distinct inner cap of a plasma arc torch is typically used to provide shield gas swirling prior to conveying the swirled gas to the shield. Moving the shield gas swirling feature from the inner cap to the shield 114 is advantageous at least because distinct and customized shield gas swirls can be created for different amperages of torch operation without the cumbersome need of installing different inner caps. Thus, an inner cap is no longer needed for the cartridge 104. In general, the shield 114 can have different quantity, size, and/or shape (e.g., offset) of the apertures 810 to produce desired cut angles per amperage.

Figure 9:
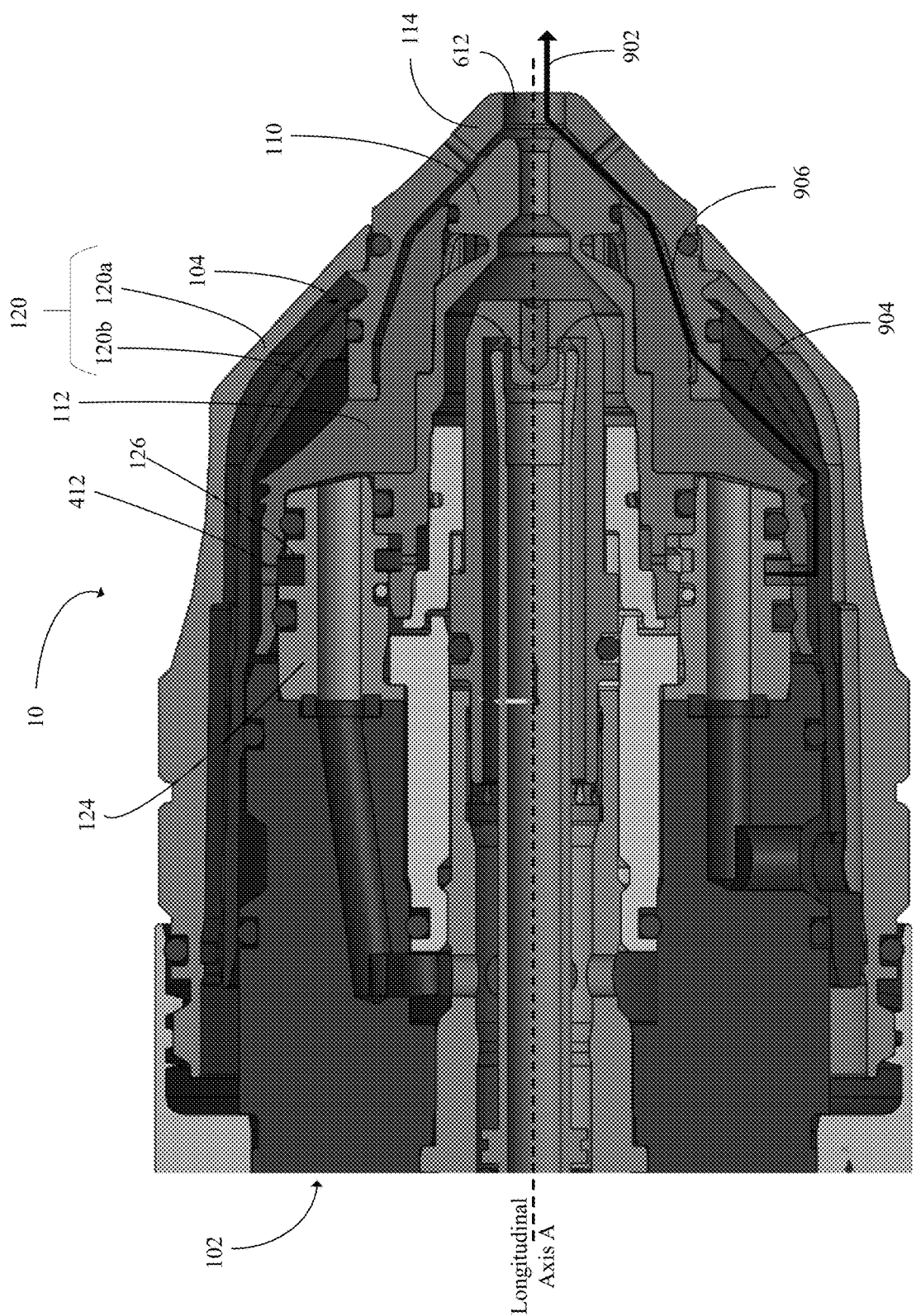
FIG. 9 shows a sectional view of the plasma arc torch of FIG. 2 oriented to illustrate an exemplary shield gas flow path from the torch body to the cartridge of the torch, according to some embodiments of the present invention.

FIG. 9 shows a sectional view of the plasma arc torch 10 of FIG. 2 oriented to illustrate an exemplary shield gas flow path 902 from the torch body 102 to the cartridge 104 of the torch 10, according to some embodiments of the present invention. As shown, the torch body 102 provides a flow of shield gas to the cartridge 104 via the torch connector 124 of the torch body 102. More specifically, the plurality of apertures 126 of the torch connector 124 are configured to channel and meter the shield gas flow 902 from the torch body 102 to the cartridge 104. Upon installation of the cartridge 104 onto the torch body, the plurality of apertures 412 that are circumferentially disposed about the proximal end 404 of the hollow body of the jacket 112 are adapted to axially align with the apertures 126 of the torch connector 124. Thus, the plasma gas flow 902 is radially conveyed outward from the apertures 126 to the apertures 412, at which the plasma gas flow 902 is metered and channeled from an interior surface of the cartridge jacket 112 to an exterior surface of the jacket 112. Upon exiting the apertures 412, the shield gas flow 902 is further conveyed to a shield gas flow passage 904 defined between the exterior surface of the jacket 112 and the interior surface of the cap liner 120b of the outer cap 120. The shield gas flow 902 is adapted to travel distally in the shield gas flow passage 904 to reach the exterior surface of the proximal end 802 of the shield 114. The shield gas flow 902 can then flow from the exterior surface of the shield 114 to the interior surface of the shield 114 via the plurality of swirl apertures 810 (shown in FIG. 8) disposed circumferentially about the proximal end 802. As described above, the apertures 810 are shaped and sized to impart a tangential velocity component to the shield gas flow 902 therethrough, thereby creating a swirl pattern in the shield gas flow 902. Upon exiting the apertures 810, the shield gas 902 is adapted to flow distally via a gas flow passage 906 defined between the interior surface of the shield 114 and the exterior surface of the combination of the cartridge jacket 112 and the distal end 606 of the nozzle 110 that are disposed inside of the hollow body of the shield 114. The gas flow passage 906 is configured to convey the shield gas flow 902 to the shield exit orifice 612 to expel the shield gas from the tip of the torch 10.

Figure 10:
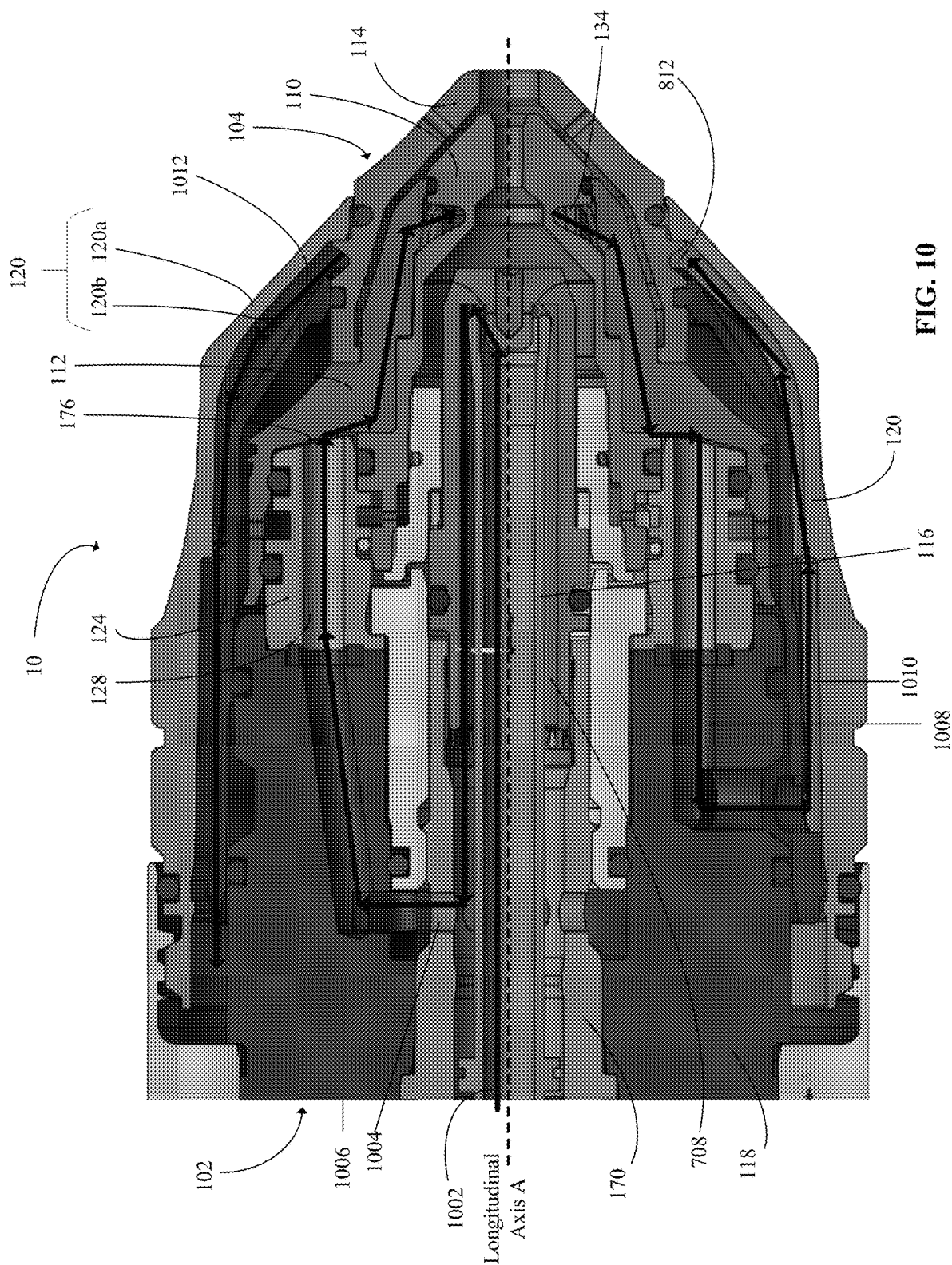
FIG. 10 shows a sectional view of the plasma arc torch of FIG. 2 oriented to illustrate an exemplary liquid coolant flow path that circulates between the torch body and the cartridge of the torch, according to some embodiments of the present invention.

FIG. 10 shows a sectional view of the plasma arc torch of FIG. 2 oriented to illustrate an exemplary liquid coolant flow path 1002 that circulates between the torch body 102 and the cartridge 104 of the torch 10, according to some embodiments of the present invention. In some embodiments, such cooling flow 1002 is performed at substantially the same time as the shield gas flow 902 explained above with respect to FIG. 9. Along the liquid coolant flow path 1002, a liquid coolant is first introduced to the cartridge 104 from the torch body 102 via the coolant tube 116. The coolant flow 1002 is configured to travel distally within the coolant tube 116 and exit from the coolant tube 116 via a distal opening. Upon exiting the coolant tube 116, the liquid coolant flow 1002 enters into the central cavity 708 of the electrode 108 of the cartridge 104 within which the coolant tube 116 is housed, thereby substantially cooling the electrode 108. As guided by the wall of the cavity 708, the coolant flow 1002 reverses direction and continues on proximally in the cavity 708 along the outer surface of the coolant tube 116. The coolant flow 1002 continues toward the cathode 170 of the torch body 102 and radially flows outward into the torch insulator 118 via an aperture 1004 disposed on the body of the cathode 170, where the aperture 1004 is in fluid communication with an axial channel 1006 disposed inside of the torch insulator 118. The axial channel 1006 is configured to be in fluid communication with the first group 178 of axial channels 128 disposed in the torch connector 124. Once inside of the insulator 118, the coolant 1002 flows distally through the axial channel 1006 and enters one or more of the first group 178 of axial channels 128 in the torch connector 124.

Upon exiting from the distal openings 128b of the one or more axial channels 128 in the first group 178 of axial channels 128 in the torch body 102, the coolant flow 1002 is adapted to enter the cartridge 102 via the circumferential channel 176 defined between the torch connector 124 and the proximal end 404 of the cartridge jacket 112. From thereon, the coolant flow 1002 can enter one or more of the coolant passages 414 defined between the jacket 112 and the nozzle 110 via the corresponding proximal opening(s) 414a of the passages 414. Once within the coolant passages 114, the coolant flow 1002 is adapted to flow distally toward the corresponding distal openings 414b and enter the circumferential channel 134 located distal to the distal openings 414b, where the circumferential channel 134 is defined by the circumferential slot 134a disposed/etched into the exterior surface of the nozzle 110 and a corresponding circumferential interior surface 134b of the jacket 112. The coolant flow 1002 is adapted to circulate within the circumferential channel 134 and around the exterior surface of the distal end of the nozzle 110, thereby convectively cooling the tip of the nozzle 110. Further, the coolant flow 1002 is adapted to return to the torch body 102 by flowing distally through one or more of the second group 182 of axial channels 128 (located about 180 degrees radially offset from the first group 178 of axial channels 128) via one or more of the coolant flow passages 414 that are in fluid communication with the second group 178 of axial channels 128.

Once inside of the one or more axial channels 128 in the second group 182 of axial channels 128 in the torch connector 124, the coolant flow 1002 is adapted to flow distally into an axial channel 1008 in the insulator 118 of the torch body 102. In some embodiments, the axial channels 1008 and 1006 are radially offset relative to each other in the torch insulator 118, such as by about 180 degrees. Thereafter, the coolant flow 1002 exits from the axial channel 1008 and travels radially outward into a coolant passage 1010 defined between the cap liner 120b and the cap shell 120a of the outer cap 120. The coolant 1002 is conducted to flow proximally through the coolant passage 1010 toward the circumferential channel 812 disposed into the exterior surface on the proximal end 802 of the shield 114. Once in the circumferential channel 812, the coolant flow 1002 is adapted to circulate around the exterior surface of the shield 114 to convectively cool the shield 114, and exit from the channel 812 on the other side of the shield 114 substantially opposite from where it enters the circumferential channel 812. From thereon, the coolant flow 1002 is adapted to return to the torch body 102 by flowing proximally in an axial channel 1012 defined between the cap liner 120b and the cap shell 120a of the outer cap 120. In some embodiment, the axial channels 1010 and 1012 are radially offset relative to each other, such as by about 180 degrees.

Figure 11A:
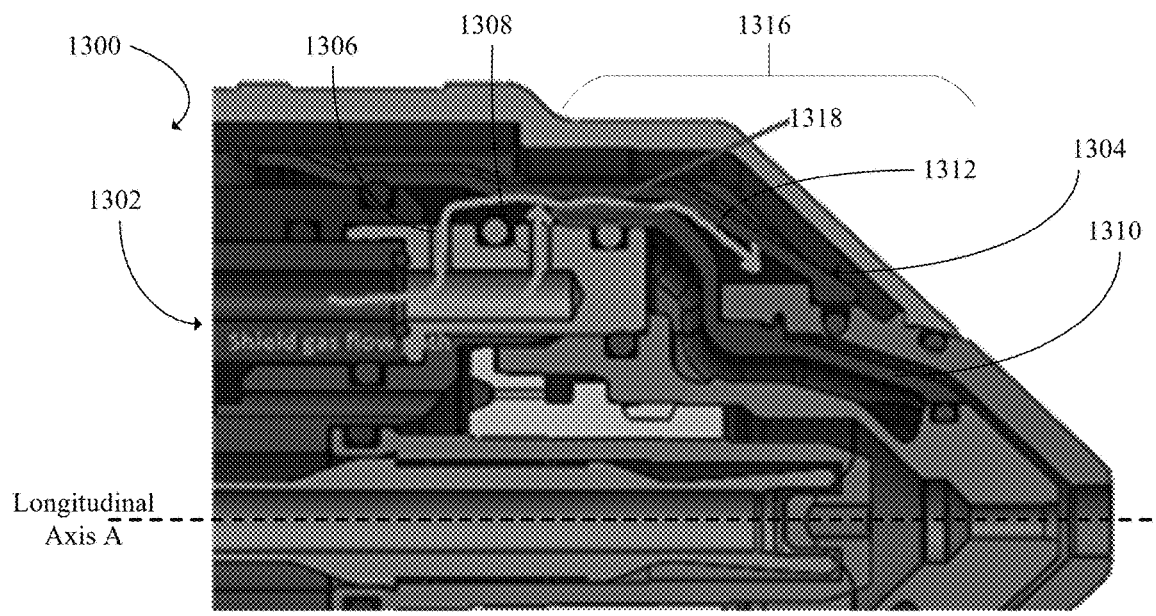
FIGS. 11a and 11b show a cross-sectional profile view of another exemplary plasma arc torch with different configurations to provide variable shield gas flow rates, according to some embodiments of the present invention.
Figure 11B:
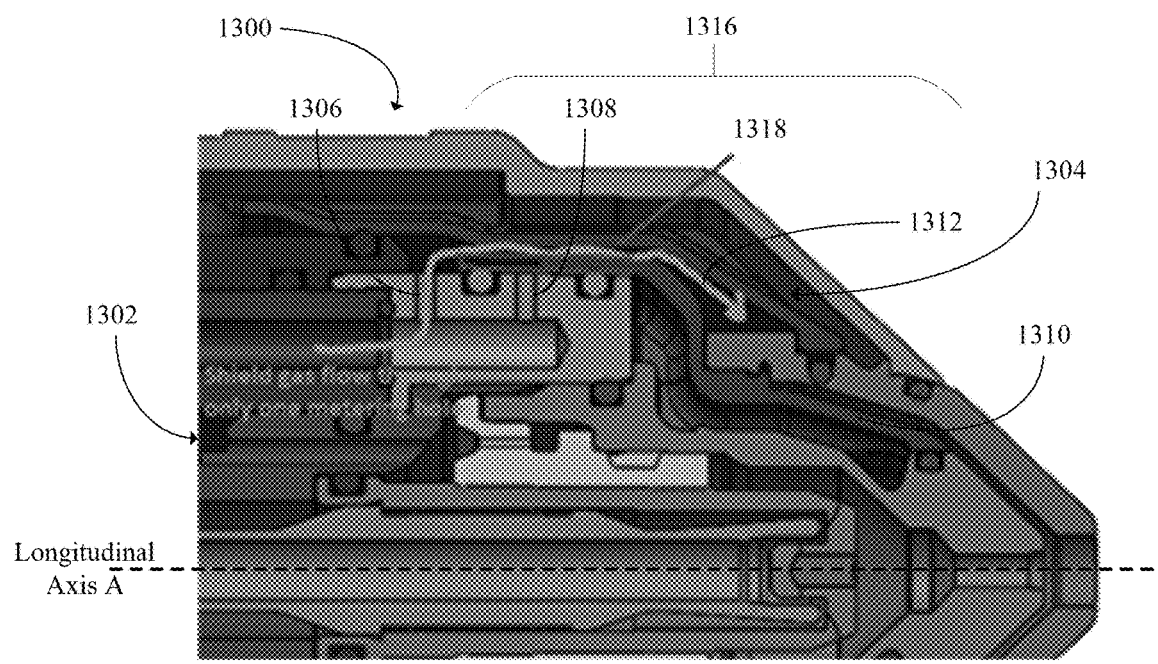

FIGS. 11a and 11b show a cross-sectional profile view of another exemplary plasma arc torch 1300 with different configurations to provide variable shield gas flow rates, according to some embodiments of the present invention. As shown, the torch 1300 comprises a torch body 1302 and a consumable jacketed cartridge 1304. The torch body 1302 of the plasma arc torch 1300 can be substantially similar to the torch body 102 of the plasma arc torch 10 of FIG. 2, except instead of having one set of apertures 412 circumferentially disposed on the torch connector 124 of the torch body 102, two sets of apertures 1306 and 1308 are disposed on the torch connector 1324 of the torch body 1302. The two sets of apertures 1306, 1308 are axially spaced relative to each other and are both configured to conduct a shield gas through respective ones of the apertures for conveying the shield gas from the torch body 1302 to the cartridge 1304.

In some embodiments, the cartridge 1304 of the plasma arc torch 1300 is substantially similar to the cartridge 104 of the plasma arc torch 10, except the axial length 1316 of the cartridge jacket 1310 of the cartridge 1304 is designed to be variable to selectively cover (e.g., provide a fluid-tight seal of) one or none of the two sets of apertures 1306, 1308 depending on an operating current requirement of the cartridge 1304. Thus, if a "high" gas flow range is desired, the axial length 1316 of the jacket 1310 can be designed to be short such that the proximal end 1318 of the jacket 1310 leaves both sets of apertures 1306, 1308 exposed, thereby allowing the shield gas to flow through both sets of apertures, as illustrated by the shield gas flow path 1312 of FIG. 11a. In contrast, if a "low" gas flow range is desired, the axial length 1316 of the jacket 1310 can be designed to be relatively long such that the proximal end 1318 of the jacket 1310 covers the distal set of apertures 1308 but leaves the proximal set of apertures 1306 exposed, as illustrated by the shield gas flow path 1314 of FIG. 11b. In some embodiments, the shield gas pressure is subsequently adjusted to achieve the shield flow rate required for the process. For example, for a given cutting process, the shield gas flow rate can be optimized to get good cut quality given the consumable geometry being used. Essentially, controlling shield gas flow rate by manipulating the apertures 1306, 1038 can be used to achieve desired cutting characteristics.

In some embodiments, a dimension (e.g., diameter) for the set of proximal apertures 1306 can be different from a dimension (e.g., diameter) for the set of distal apertures 1308 to achieve a desired gas flow rate. In some embodiments, more than two sets of apertures can be disposed on the torch connector 124 of the torch body, where the multiple sets of apertures are axially spaced relative to each other. Thus, the axial length of the jacket 1310 can be adjusted to cover/seal one or more of the multiple sets of apertures to further refine shield gas flow rate tuning.

Figure 12:
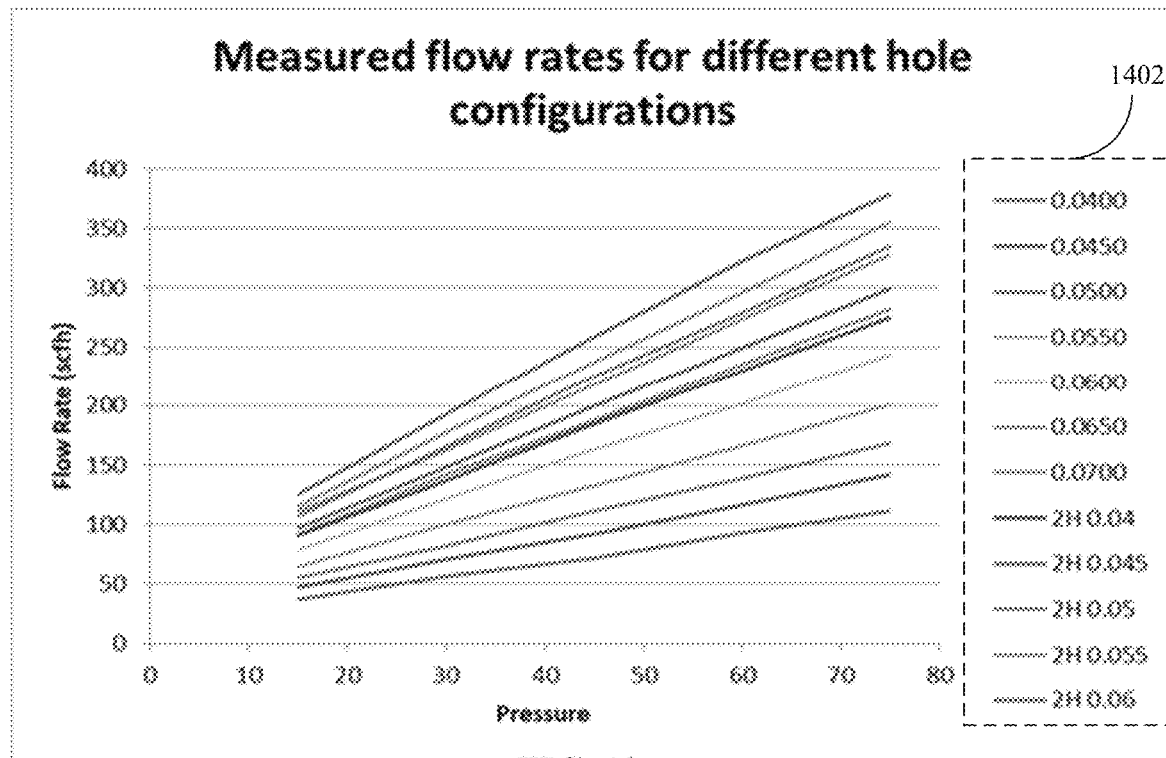
FIG. 12 shows a set of exemplary performance results for the different configurations of the plasma arc torch of FIGS. 11a and 11b, according to some embodiments of the present invention.

FIG. 12 shows a set of exemplary performance results for the different configurations of the plasma arc torch 1300 of FIGS. 11a and 11b, according to some embodiments of the present invention. To generate these results, the diameter of the two sets of apertures 1306, 1308 are set to be about the same, but are varied for different performance evaluations. These diameters can range from about 0.04 inches to about 0.07 inches, as indicated in the legend 1402. More specifically, at each unique diameter, both the apertures 1306, 1308 are configured to have about the same diameter value, and shield gas flow rates are measured with (i) only one aperture 1306 exposed as illustrated in the configuration of FIG. 11b and (ii) both apertures 1306, 1308 exposed as illustrated in the configuration of FIG. 11a. Therefore, for the graph of FIG. 12, each unique diameter corresponds to two performance lines, one labeled "2H-diameter value" indicating that both apertures are exposed at that particular diameter value and the other labeled "diameter value" indicated that only one aperture is exposed at that diameter value. In general, the lower line of each pair of lines (at the same diameter value) represents a single aperture 1306 conducting the shield gas and the upper line of each pair of lines (at the same diameter value) represents both apertures 1306, 1308 of the same size conducting the shield gas. As shown, covering one or both of sets of these apertures provides a full range of shield gas flow rates necessary for most cutting processes. More specifically, allowing both sets of apertures 1306, 1308 to conduct the shield gas (as illustrated in FIG. 11a) can achieve a shield gas flow rate of between about 135 scfh (standard cubi feet per hour) and about 330 scfh. Allowing only the proximal set of apertures 1306 to conduct the shield gas (as illustrated in FIG. 11b) can achieve a shield gas flow rate of between about 70 scfh and about 170 scfh. Moreover, a different diameter size (e.g., 040" inches instead of 0.050" inches) provides a slightly different overall shield gas flow range, but has a substantially similar flow rate trend as those of the other diameter sizes.

Figure 13:
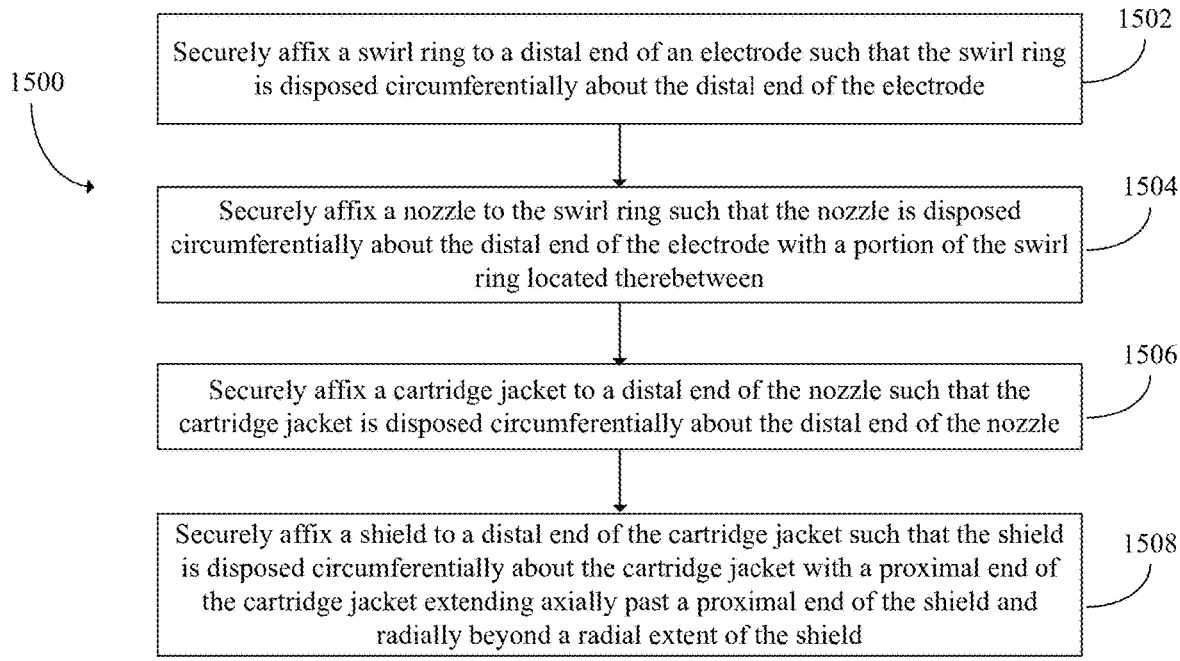
FIG. 13 illustrates an exemplary process for assembling the consumable jacketed cartridge of the liquid cooled plasma arc torch of FIG. 2, according to some embodiments of the present invention.

FIG. 13 illustrates an exemplary process 1500 for assembling the consumable jacketed cartridge 104 of the liquid cooled plasma arc torch 10 of FIG. 2, according to some embodiments of the present invention. The process 1500 starts by securely affixing the swirl ring 150 to the distal end of the electrode 108 such that the swirl ring 150 is disposed circumferentially about the distal end of the electrode 108 (step 1502). Such secured attachment creates at least two alignment interfaces 390, 392 between the swirl ring 150 and the electrode 108 that radially and axially align the two components relative to each other. The nozzle 110 is securely affixed to the swirl ring 150 such that the nozzle 110 is disposed circumferentially about the distal end of the electrode 108 with a portion of the swirl ring 150 located therebetween (step 1504). In some embodiments, the secure affixation of the swirl ring 150 and the electrode 108 is achieved when the nozzle 110 is securely affixed to the swirl ring 150, thereby applying an external pressure on the engagement/alignment interfaces between the swirl ring 150 and the electrode 108. The secured attachment between the nozzle 110 and the swirl ring 150 creates at least two alignment interfaces 394, 396 therebetween that radially and axially align the two components relative to each other. The cartridge jacket 112 is securely affixed to the distal end of the nozzle 110 such that the cartridge jacket 112 is disposed circumferentially about the distal end of the nozzle 110 (step 1506). Such secured attachment creates two or more (e.g., three) alignment interfaces 399, 398, 399 between the nozzle 110 and the cartridge jacket 112 that radially and axially align the two components relative to each other. Further, the shield 114 can be securely affixed to the distal end of the cartridge jacket 112 such that the shield 114 is disposed circumferentially about the cartridge jacket 112 with the proximal end 404 of the cartridge jacket 112 extending axially past the proximal end 802 of the shield 114 and radially beyond a radial extent of the shield 114 (step 1508). Such secured attachment creates at least one alignment interface 384 between the cartridge jacket 112 and the shield 114 that radially and axially align the two components relative to each other. Thus, the shield 114 is axially and radially aligned (as well as electrically isolated from) the nozzle 110 by the jacket 112, which can be formed from an injection moldable material. In some embodiments, the one or more alignment interfaces achieved throughout the cartridge 102 also serves as fluid seals (e.g., liquid and/or gas seals) at their corresponding locations. In some embodiment, the secured affixation/engagement of the various components of the cartridge 104 is permanent for the useful life of a cartridge.

Figure 14:
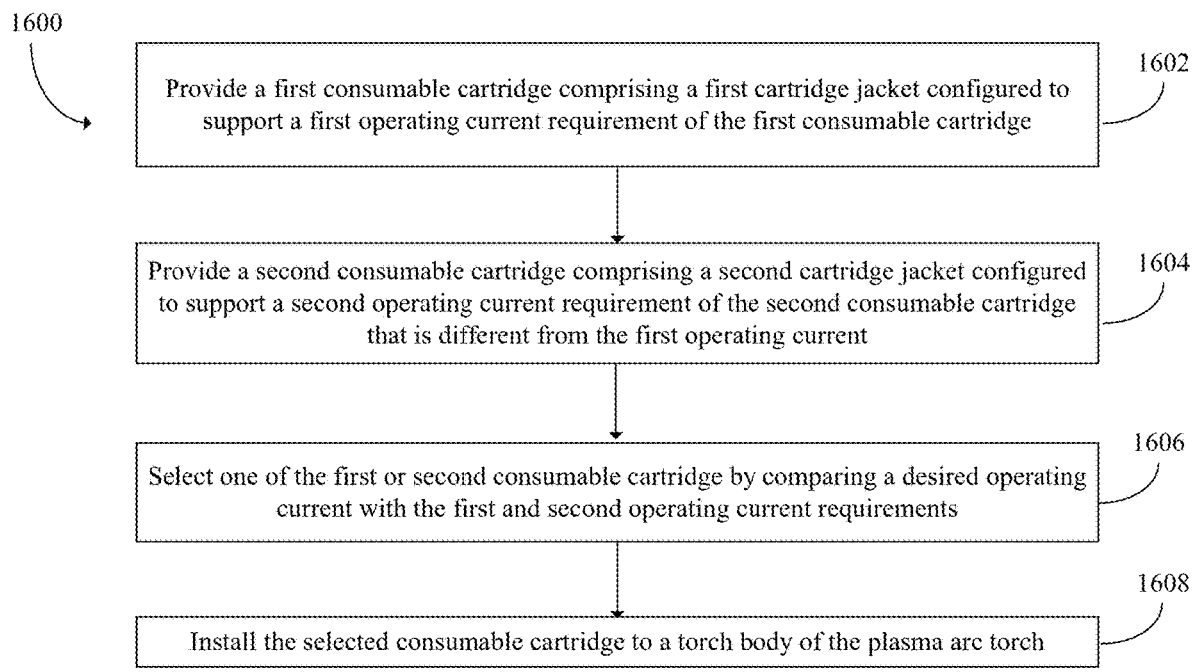
FIG. 14 illustrates an exemplary process for selecting and installing a desired consumable cartridge for a plasma arc torch, according to some embodiments of the present invention.

FIG. 14 illustrates an exemplary process 1600 for selecting and installing a desired consumable cartridge for a plasma arc torch, according to some embodiments of the present invention. The process 1600 starts with providing a first consumable jacketed cartridge that includes a jacket configured to achieve a first desired shield gas flow rate corresponding to a first operating current requirement of the cartridge (Step 1602). The jacket of the first cartridge can be similar in configuration to the jacket 112 of FIG. 2 or the jacket 1310 of FIGS. 11a and 11b. More particularly, if the jacket of the first cartridge is similar to the jacket 112 of FIG. 2, the jacket includes a set of shield gas apertures 412 circumferentially disposed on the proximal end of the jacket, where the apertures are dimensioned to meter channel a gas flow therethrough at the first desired flow rate. If the jacket of the first consumable cartridge is similar to the jacket 1310 of FIGS. 11a and 11b, the axial length of the jacket is set to cover one set or both sets of the shield gas apertures 1306, 1306 in the torch body to realize the first desired flow rate.

A second consumable jacketed cartridge is provided that includes a jacket configured to achieve a second desired shield gas flow rate corresponding to a second operating current requirement of the second cartridge that is different from the first operating current (Step 1604). The jacket of the second cartridge can be similar in configuration to the jacket 112 of FIG. 2 or the jacket 1310 of FIGS. 11a and 11b. More particularly, if the jacket of the second cartridge is similar to the jacket 112 of FIG. 2, the jacket includes a set of shield gas apertures with a different size (e.g., diameter) from the size (e.g., diameter) of the shield gas apertures of the first cartridge to realize the different flow rate and operating current requirement. If the jacket of the second consumable cartridge is similar to the jacket 1310 of FIGS. 11a and 11b, the jacket is configured to have an axial length that is different from the axial length of the jacket of the first cartridge to realize the different flow rate and operating current requirement. The different axial lengths of the jackets are adapted to cover different numbers of the corresponding shield gas apertures in the torch body for achieving the different operating current requirements.

An operator can select one of the first or second cartridge as the desired consumable cartridge by comparing a desired operating current with the different operating current requirements associated with the first and second cartridges (step 1606). Thereafter, the operator can install the selected consumable cartridge onto a torch body to fully assemble the torch (step 1608). In some embodiments, for the selected cartridge, a diameter of the shield gas apertures 810 disposed in the body of the shield 114 is also appropriately dimensioned and optimized to support the operating current requirement of the cartridge.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A jacketed consumable cartridge for a liquid cooled plasma arc torch, the jacketed consumable cartridge comprising:
   an electrode;
   a swirl ring securely affixed to and disposed circumferentially about a distal end of the electrode;
   a nozzle securely affixed to the swirl ring, the nozzle disposed circumferentially about the distal end of the electrode with a portion of the swirl ring located therebetween;
   a cartridge jacket securely affixed to and disposed circumferentially about a distal end of the nozzle; and
   a shield securely affixed to and disposed circumferentially about a distal end of the cartridge jacket, wherein a proximal end of the cartridge jacket is adapted to extend (i) axially past a proximal end of the shield and (ii) radially beyond a radial extent of the shield, and
   wherein the electrode, the swirl ring, the nozzle, the cartridge jacket and the shield are securely affixed to each other to form a unitary component and each of the electrode, the swirl ring, the nozzle cartridge jacket and the shield is not individually serviceable or disposable once the unitary component is formed.

2. The jacketed consumable cartridge of claim 1, wherein the swirl ring is securely affixed to the electrode via two distinct circumferential interfaces on an interior surface of the swirl ring.

3. The jacketed consumable cartridge of claim 1, wherein the nozzle is securely affixed to the swirl ring via two distinct circumferential interfaces on an exterior surface of the swirl ring.

4. The jacketed consumable cartridge of claim 3, wherein the swirl ring includes a plurality of slots formed on the exterior surface and dispersed circumferentially about the swirl ring, the plurality of slots shaped to complement an interior profile of the nozzle to define a set of gas swirl passages.

5. The jacketed consumable cartridge of claim 4, wherein each of the plurality of slots is canted.

6. The jacketed consumable cartridge of claim 1, wherein the cartridge jacket is securely affixed to the nozzle via at least two distinct circumferential interfaces on an exterior surface of the nozzle.

7. The jacketed consumable cartridge of claim 1, wherein the shield is securely affixed to the cartridge jacket via a retention feature disposed circumferentially about an external surface of the cartridge jacket, the retention feature configured to receive the proximal end of the shield to securely affix the shield.

8. The jacketed consumable cartridge of claim 1, wherein at least one of the swirl ring or the cartridge jacket is constructed from an injection moldable plastic material.

9. The jacketed consumable cartridge of claim 1, wherein the cartridge jacket is circumferentially disposed between the nozzle and the shield to physically separate and electrically isolate the nozzle and the shield.

10. The jacketed consumable cartridge of claim 1, wherein the proximal end of the cartridge jacket is shaped to flexibly engage a torch body of the plasma arc torch to form a seal that is substantial fluid tight to enable conveyance of both a liquid and a gas from the torch body to the cartridge.

11. The jacketed consumable cartridge of claim 10, wherein the cartridge jacket includes a plurality of apertures circumferentially disposed about the proximal end, each aperture, connecting an interior surface to an exterior surface of the cartridge jacket, being configured to meter and channel the gas from the torch body to the shield.

12. The jacketed consumable cartridge of claim 10, wherein the cartridge jacket includes a plurality of axial channels disposed in an interior surface of the cartridge jacket and interspersed circumferentially around the cartridge jacket, the plurality of axial channels configured to complement an external profile of the nozzle to define respective ones of coolant passages for conveying the liquid between the nozzle and the jacket.

13. The jacketed consumable cartridge of claim 1, wherein the nozzle comprises an alignment surface on an outer circumference of a proximal end of the nozzle, the alignment surf ace configured to enable alignment of the cartridge with a torch body of the plasma arc torch upon engagement between the cartridge and the torch body.

14. The jacketed consumable cartridge of claim 1, wherein the electrode comprises a silver end disposed on the distal end of the electrode.

15. The jacketed consumable cartridge of claim 1, wherein the shield includes a plurality of apertures disposed circumferentially about the proximal end of the shield, each aperture shaped to channel, meter, and swirl a gas flow traveling therethrough toward a shield exit orifice.

16. The jacketed consumable cartridge of claim 1, wherein a ratio of a length of the consumable cartridge to a width of the consumable cartridge is less than 1.25.

17. A jacket for a consumable cartridge of a liquid cooled plasma arc torch, the consumable cartridge, which includes an electrode, a nozzle and a shield, configured to removably attach to a torch body of the plasma arc torch, the jacket comprising:
   an electrically insulating hollow body defining a longitudinal axis extending therethrough;
   a distal end of the hollow body disposed along the longitudinal axis, the distal end configured to (i) matingly engage the nozzle at an interior surface of the hollow body, and (ii) extend into a proximal end of the shield to matingly engage the shield at an exterior surface of the hollow body;
   a proximal end of the hollow body disposed along the longitudinal axis opposite of the distal end, the proximal end extending axially past the proximal end of the shield and radially beyond a radial extent of the shield, the proximal end configured to matingly engage the torch body; and
   a plurality of axial channels disposed into the interior surface of the hollow body and interspersed circumferentially around the hollow body, the plurality of axial channels configured to complement an external profile of the nozzle to define respective liquid coolant passages between the nozzle and the jacket.

18. The jacket of claim 17, further comprising a plurality of apertures circumferentially disposed about the proximal end of the hollow body, wherein each aperture connects the interior surface of the hollow body to the exterior surface of the hollow body, and is configured to meter and channel a gas flow from the torch body to the shield.

19. The jacket of claim 17, wherein the proximal end of the hollow body includes a circumferential coolant channel proximal to and in fluid communication with the plurality of axial channels to convey a coolant flow between the torch body and the nozzle via the plurality of axial channels.

20. The jacket of claim 17, further comprising a retention feature disposed circumferentially about the external surface of the jacket at the distal end, the retention feature configured to receive the proximal end of the shield and lockingly engage the shield to the hollow body.

21. The jacket of claim 17, further comprising a plurality of interior alignment surfaces circumferentially disposed on the interior surface of the jacket, the plurality of interior alignment surfaces configured to axially and radially align the nozzle relative to the jacket.

22. The jacket of claim 21, further comprising an exterior alignment surface circumferentially disposed on the exterior surface of the jacket, the exterior alignment surface configured to axially and radially align the shield relative to the nozzle via the jacket.

23. The jacket of claim 17, wherein the hollow body is constructed from an injection moldable plastic material.

24. The jacket of claim 17, wherein a ratio of a length of the jacket to a width of the proximal end is between 0.7 and 0.85, and a ratio of the length of the jacket to a width of the distal end is between 1.4 and 1.6.

25. A method for assembling the jacketed consumable cartridge of claim 1, the method comprising:
securely affixing the swirl ring to the distal end of the electrode such that the swirl ring is disposed circumferentially about the distal end of the electrode;
securely affixing the nozzle to the swirl ring such that the nozzle is disposed circumferentially about the distal end of the electrode with the portion of the swirl ring located therebetween;
securely affixing the cartridge jacket to the distal end of the nozzle such that the cartridge jacket is disposed circumferentially about the distal end of the nozzle; and
securely affixing the shield to the distal end of the cartridge jacket such that the shield is disposed circumferentially about the cartridge jacket with the proximal end of the cartridge jacket extending axially past the proximal end of the shield and radially beyond the radial extent of the shield.

26. The method of claim 25, further comprising axially and radially aligning the shield relative to the nozzle via the cartridge jacket.

27. The method of claim 25, further comprising electrically isolating the shield and the nozzle by the cartridge jacket.

28. The method of claim 27, wherein the cartridge jacket is constructed from an injection moldable plastic material.

29. The method of claim 25, further comprising forming a plurality of axial cooling passages in the cartridge, the plurality of cooling passages defined by (i) respective ones of a plurality of axial channels disposed into an interior surface the cartridge jacket and interspersed circumferentially about the cartridge jacket and (ii) a complementary external surface of the nozzle.

30. The method of claim 25, wherein the radially extending proximal end of the cartridge jacket comprises a plurality of apertures circumferentially disposed about the proximal end, wherein each aperture is configured to meter and channel a gas flow from a torch body to the shield.

31. The method of claim 25, further comprising disposing a silver tip to the distal end of the electrode.

32. The method of claim 25, wherein a ratio of a length of the consumable cartridge to a width of the jacket is less than 1.25.

33. The method of claim 25, further comprising attaching the consumable cartridge to a torch body of the plasma arc torch, the nozzle of the consumable cartridge being adapted to axially and radially align the consumable cartridge relative to the torch body.

34. A method for conveying at least one of a gas or a liquid in a liquid cooled plasma arc torch that comprises the jacketed consumable cartridge of claim 1 and a torch body, the method comprising:
coupling the jacketed consumable cartridge to the torch body of the plasma arc torch;
conveying the gas from the torch body to a plurality of apertures circumferentially disposed about the proximal end of the cartridge jacket of the jacketed consumable cartridge; and
metering and channeling, by the plurality of apertures, the gas from an interior surface of the cartridge jacket to an exterior surface of the cartridge jacket for conveyance of the gas over an exterior surface of the shield.

35. The method of claim 34, further comprising:
metering and channeling, by a plurality of apertures disposed circumferentially about the proximal end of the shield, the gas from the exterior surface of the shield to an interior surface of the shield;
imparting, by the plurality of apertures disposed into the shield, a swirling pattern to the gas flow therethrough; and
expelling the gas from the plasma arc torch via an exit orifice of the shield.

36. The method of claim 35, further comprising circulating the liquid between the cartridge and the torch body to cool the plasma arc torch, circulating the liquid comprising:
conveying the liquid from at least one aperture of the torch body to one or more of a plurality of axial cooling passages defined by (i) respective ones of a plurality of axial channels disposed into an interior surface the cartridge jacket and interspersed circumferentially about the cartridge jacket and (i) an external surface of the nozzle;
conducting, by the one or more cooling passages, the liquid from the proximal end of the nozzle to the distal end of the nozzle over the external surface of the nozzle to cool the nozzle;
circulating the liquid around the distal end of nozzle; and
directing at least a portion of the liquid to the shield to cool the shield.

37. The method of claim 36, wherein the at least portion of the liquid is directed to cool an exterior surface of the shield.

38. The method of claim 34, further comprising forming a seal between the torch body and the proximal end of the cartridge jacket that is substantially fluid tight to enable conveyance of both the liquid and the gas from the torch body to the cartridge, wherein the seal establishes a flexible engagement between the torch body and the proximal end of the cartridge jacket.

* * * * *